United States Patent
Larsen

(10) Patent No.: US 9,736,637 B2
(45) Date of Patent: Aug. 15, 2017

(54) POSITION DETERMINATION OF MOBILE STATIONS IN A WIRELESS NETWORK

(75) Inventor: James David Larsen, Woodinville, WA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 1257 days.

(21) Appl. No.: 12/066,745

(22) PCT Filed: Sep. 13, 2006

(86) PCT No.: PCT/IB2006/002516
§ 371 (c)(1),
(2), (4) Date: Mar. 13, 2008

(87) PCT Pub. No.: WO2007/031844
PCT Pub. Date: Mar. 22, 2007

(65) Prior Publication Data
US 2008/0280625 A1  Nov. 13, 2008

Related U.S. Application Data

(60) Provisional application No. 60/716,799, filed on Sep. 13, 2005.

(51) Int. Cl.
*H04W 24/00* (2009.01)
*H04W 4/02* (2009.01)
(Continued)

(52) U.S. Cl.
CPC .......... *H04W 4/023* (2013.01); *G01S 5/0226* (2013.01); *G01S 5/0289* (2013.01); *G01S 5/14* (2013.01);
(Continued)

(58) Field of Classification Search
USPC ........................................ 370/338; 455/456.1
See application file for complete search history.

(56) References Cited

U.S. PATENT DOCUMENTS

| | | | |
|---|---|---|---|
| 6,097,703 A | 8/2000 | Larsen et al. | |
| 6,473,617 B1 | 10/2002 | Larsen et al. | |
| 6,785,510 B2 | 8/2004 | Larsen | |
| 6,810,428 B1 | 10/2004 | Larsen et al. | |
| 6,965,568 B1 | 11/2005 | Larsen | |
| 7,317,925 B2 * | 1/2008 | Niu ....................... | H04W 64/00 455/418 |
| 7,590,068 B2 | 9/2009 | Larsen et al. | |

(Continued)

FOREIGN PATENT DOCUMENTS

| | | |
|---|---|---|
| DE | 10101283 | 7/2002 |
| DE | 10101285 | 7/2002 |
| WO | 96/19887 | 6/1996 |

OTHER PUBLICATIONS

International Search Report PCT/IB2006/002516.

*Primary Examiner* — Joshua Schwartz
(74) *Attorney, Agent, or Firm* — Haynes and Boone, LLP

(57) ABSTRACT

A network, and a method of operating a network. The network includes a plurality of stations each able to transmit and receive data so that the network can transmit data between stations via at least one selected intermediate station. Each station transmits probe signals in broadcast fashion to other stations to gather a list of neighbor stations. The stations transmit position data and/or position determining data in at least some of the probe signals. Each station maintains position data and/or position determining data received from selected probing stations, and utilizes the data to determine the absolute or relative position of itself and/or other stations. The stations can determine the relative or absolute position of other stations in direct communication with themselves, and also of other stations not in direct communication with themselves.

46 Claims, 17 Drawing Sheets

(51) Int. Cl.
  *G01S 5/02*  (2010.01)
  *G01S 5/14*  (2006.01)
  *H04B 7/26*  (2006.01)
  *H04W 56/00*  (2009.01)
  *H04W 64/00*  (2009.01)
  *H04L 29/08*  (2006.01)
  *H04L 29/06*  (2006.01)
  *H04W 8/14*  (2009.01)

(52) U.S. Cl.
  CPC ........... *H04B 7/2606* (2013.01); *H04L 67/18* (2013.01); *H04L 69/28* (2013.01); *H04W 4/02* (2013.01); *H04W 56/0015* (2013.01); *H04W 64/00* (2013.01); *H04W 64/006* (2013.01); *H04W 8/14* (2013.01)

(56) References Cited

U.S. PATENT DOCUMENTS

| | | | |
|---|---|---|---|
| 8,493,882 B2 * | 7/2013 | Miyoshi | H04L 45/00 370/230 |
| 2002/0191573 A1 * | 12/2002 | Whitehill et al. | 370/338 |
| 2003/0011511 A1 * | 1/2003 | King et al. | 342/357.02 |
| 2003/0185166 A1 * | 10/2003 | Belcea | 370/321 |
| 2004/0152471 A1 * | 8/2004 | MacDonald et al. | 455/456.1 |
| 2005/0063356 A1 | 3/2005 | Larsen et al. | |
| 2005/0135242 A1 | 6/2005 | Larsen et al. | |
| 2005/0135270 A1 | 6/2005 | Larsen et al. | |
| 2007/0280262 A1 | 12/2007 | Larsen et al. | |
| 2009/0133105 A1 | 5/2009 | Larsen | |

\* cited by examiner

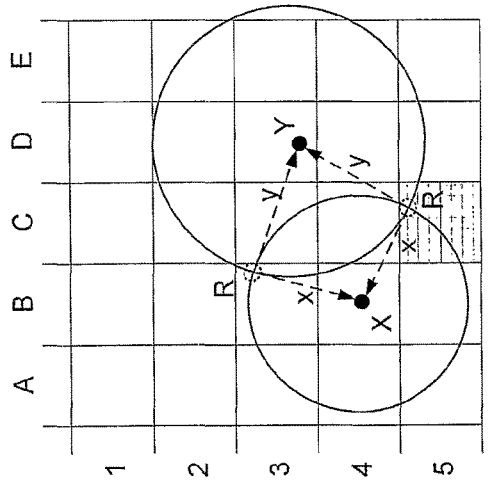
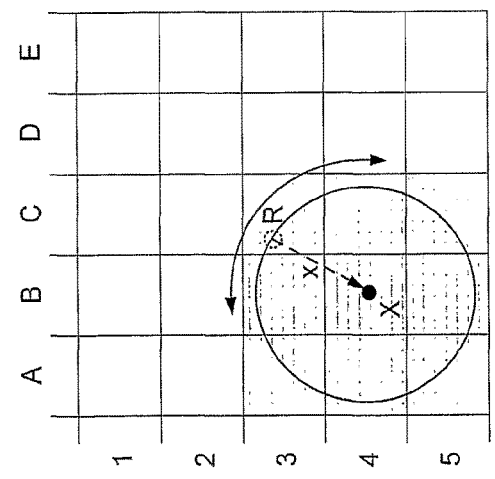
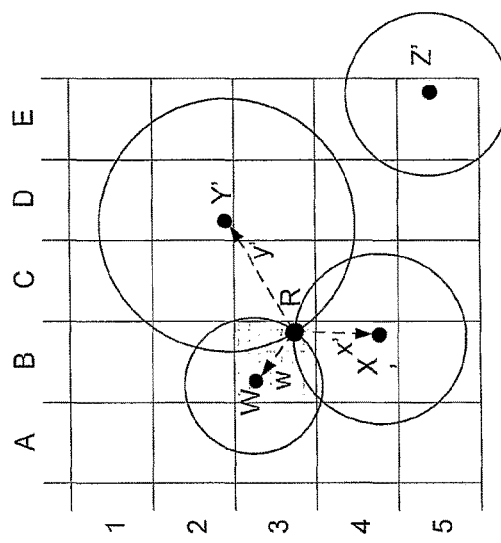
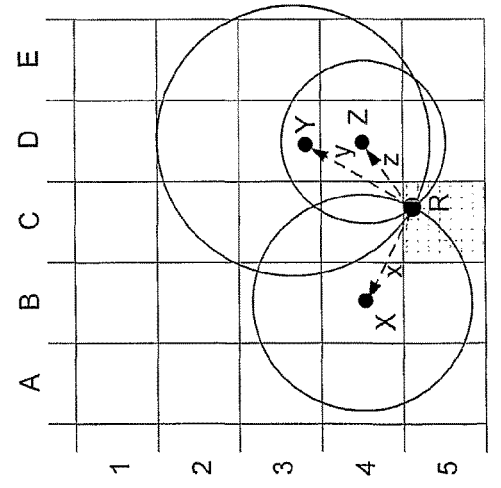

POSITION DETERMINATION OF MOBILE STATIONS IN A WIRELESS NETWORK

BACKGROUND OF THE INVENTION

This invention relates to a method of locating and determining the position of wireless mobile stations in a communication network. For the purposes of this specification, such a communication network will be referred to as an Opportunity Driven Multiple Access (ODMA) network.

The determination of location is useful to service providers in the provision of location based services to subscribers to a communication network. Such services include, for example, the provision of driving direction instructions, vehicle tracking, relevant regional information and available applications; while also enabling categorization of subscribers for various purposes and for billing differentiation.

In addition, various regulatory authorities around the world now require that service providers of wireless telephone networks must be capable of locating the users of the wireless telephones in order to facilitate emergency call processing.

These regulations mandate that the position of such users must be established to within predefined distances of their actual physical location. In the United States of America, for example, the Federal Communications Commission promulgated wireless Enhanced 911 (E911) rules require that service providers must be able to locate at least two-thirds of the users of wireless telephones on their networks within 125 meters of the users' actual physical locations.

The location of a wireless station in a network is generally determined using either network based location systems or station based location systems. Network based location systems typically utilize techniques that involve the triangulation of signals between the wireless stations and fixed position base stations or access points, which act as communication ports between the wireless stations and the network. Station based systems may incorporate other technologies such as Global Positioning System (GPS) receivers that may be built into the wireless devices of the stations or used in combination with the devices.

It is likely that the need for service differentiation will grow in relevance and that emergency regulation will possibly be extended to wireless devices other than telephones. Consequently, accurate location and positioning of the user stations has now become an essential feature in wireless networking environments. At present it is difficult to locate certain of these devices, such as in the VOIP (Voice Over Internet Protocol) environment, without using positioning equipment together with the wireless unit as there is no fixed relationship between the VOIP device and the geographic position. In addition, positioning technologies are subject to limitations that may render the stations undetectable.

It is an object of the invention to provide accurate, continuous location and positioning information relating to wireless mobile stations, including VOIP and other traditionally undetectable devices, using a network based methodology that is not dependent on base stations and access points.

SUMMARY OF THE INVENTION

According to the invention there is provided a method of operating a network comprising a plurality of stations each able to transmit and receive data so that the network can transmit data between stations via at least one selected intermediate station, the method comprising:

transmitting probe signals from each station;

transmitting position data and/or position determining data in at least some of the probe signals, the position data including data indicative of the absolute or relative position of a station transmitting a probe signal, and the position determining data including data usable by a station receiving a probe signal to determine the absolute or relative position of the station and/or other stations;

maintaining, at stations which receive probe signals from one or more probing stations, position data and/or position determining data received from selected ones of the probing stations; and at each station maintaining said position data and/or position determining data, utilizing the position data and/or position determining data to determine the absolute or relative position of said each station and/or other stations.

The position data and/or position determining data in the probe signals may include data indicating the absolute position or relative position of nearby stations selected by the station transmitting the probe signals.

The position data and/or position determining data may be used to determine the relative or absolute position of other stations in direct communication with said each station, and also other stations not in direct communication with said each station.

The method may be operated in a communication network in which the stations can transmit a message from an originating station to a destination station via at least one opportunistically selected intermediate station.

Alternatively, the method may be operated in a network provided primarily for purposes of tracking or locating stations in the network.

The method may include selecting, at each station, a channel for the transmission of probe signals to other stations, other stations which receive the probe signals from a probing station responding directly, or indirectly via other stations, on the selected channel.

The method may include transmitting clock data in the probe signals, and utilizing the clock data to determine the time taken for the probe signals to propagate between stations and hence the distance between said stations.

The method may further include synchronizing clocks at the stations of the network, with updated timing data for this purpose being transmitted from a central timing authority to the other stations.

The acceptance or rejection of said updated timing data at any station may be determined in response to a cumulative error function calculated in respect of the transmission of such data, relative to other prior or simultaneous transmissions of such data received at said station, thereby maintaining a high level of accuracy in respect of the synchronization of clocks at each station of the network.

The position data may comprise position information indicating the position of one or more stations to a predetermined degree of accuracy.

The position data may comprise absolute position information obtained from a station equipped with a station based positioning system, or a station with a known fixed location.

Alternatively or in addition the position data may comprise relative position information indicating the position of one or more stations relative to other stations.

The relative position information may be obtained by stations determining the approximate distance between themselves utilizing transmission power and/or path loss data in probe signals transmitted between such stations.

Alternatively or in addition the relative position information may be obtained by stations determining the distance between themselves utilizing timing data extracted from probe signals transmitted between the stations.

The timing data may include processing delay data inserted into reply probe signals by stations responding to received probe signals, the processing delay data indicating the time taken at a station responding to a received probe signal to process the received probe signal.

The method may include obtaining position information indicating the position of one or more stations by triangulation.

The method may comprise utilizing a combination of absolute and relative position information to determine the absolute position of further stations by determining their position relative to other stations that have previously determined their own absolute positions, so that such further stations that are unable to communicate directly with other stations that have absolute position information can nevertheless determine their own absolute position indirectly.

The method may include providing a number of seed stations, each of which is able to determine, or is provided with absolute position data defining, its own absolute position with relatively high accuracy, other stations transmitting probe signals to and receiving probe signals from the seed stations thus obtaining absolute position information from the seed stations to determine their own absolute positions, and further stations transmitting probe signals to and receiving probe signals from said other stations thus obtaining absolute position information from said other stations to determine their own absolute positions.

Each station may select received probe signals from which to extract position or timing data according to the extent to which such received probe signals are determined to contain position or timing data of a high quality in terms of distance measurement capability or clock synchronization.

The method may comprise analyzing received probe signals to determine whether or not they are transmitted during optimum peaks of opportunity.

The method may comprise measuring path loss and/or multi-path distortion in such received probe signals, and selecting probe signals having low path loss and/or low multi-path distortion for extraction of position or timing data therefrom.

Stations may include data in their probe signals relating to the length of time they have remained static, other stations receiving the probe signals utilizing position data and/or position determining data preferentially from stations that have remained static for the longest periods.

Stations may include auxiliary data in their probe signals relating to one or more of the following: the number and/or quality of transmission hops between stations identified in the probe signals; age data indicating the age of timing data or position data and/or position determining data included in the probe signals; the stated or determined level of accuracy of position information relating to one or more stations identified in the probe signals; and quality data indicating whether the probe signals have been sent at peaks of opportunity, other stations receiving the probe signals utilizing position data and/or position determining data therein selectively depending on the nature of the auxiliary data included in the received probe signals.

The probe signals may be transmitted on probe channels defined by a central authority, thereby reducing interference and preventing jamming or interception of the signals.

Stations may maintain historical position data of other stations for a predetermined time after such other stations have lost connectivity with one another, the historical position data being retrievable to determine the last known position of a station with which connectivity has been lost.

Stations may utilise variations in data in probe signals or other characteristics of the probe signals, arising out of relative movement between stations, to resolve ambiguities in relative position data and/or position determining data in the probe signals.

The nature or quality of a service available from a station in the network may be adjusted according to the determined absolute or relative position of said station and/or other nearby stations.

For example, the method may include providing information to a user of a station relating to facilities, objects or persons, or other stations near to the determined position of said station.

In one embodiment of the method a first station requiring position information relating to a second station that is moving relative to the first station may transmit gradient gathering probe signals addressed to the second station, directly or via one or more intermediate stations, at an increased rate selected to provide enhanced resolution of the position information.

The gradient gathering probe signals may be transmitted at an increased rate only while the first station requires the position information.

The increased rate of transmission of the gradient gathering probe signals is preferably at least an order of magnitude greater than a standard rate of transmission thereof.

A first station requiring position information relating to another station in the network may transmit a position request message addressed to a central authority maintaining position data and/or position determining data of stations in the network; to one or more neighbors of the first, requesting station for onward transmission to the other station; or directly to the other station.

The station whose position is required may transmit a reply message to the first station via the network with the required position information.

The first station may transmit a gradient gathering probe signal addressed to the other station via one or more intermediate stations, said other station transmitting a response via one or more intermediate stations to thereby create a gradient through the intermediate stations, the gradient providing information enabling a relative or absolute direction vector to be established between the first station and said other station.

Further according to the invention there is provided a network comprising a plurality of stations each able to transmit and receive data so that the network can transmit data between stations via at least one selected intermediate station, wherein each station in the network comprises a transmitter, a receiver and data processing means and is operable to:

transmit probe signals to other stations and receive probe signals from other stations;

transmit position data and/or position determining data in at least some of the probe signals, the position data including data indicative of the absolute or relative position of a station transmitting a probe signal, and the position determining data including data usable by a station receiving a probe signal to determine the absolute or relative position of the station and/or other stations;

maintain, at stations which receive probe signals from one or more probing stations, position data and/or position determining data received from selected ones of the probing stations; and utilize the maintained position data and/or position determining data to determine the absolute or relative position of said station and/or other stations.

including other stations in direct communication with said station, and also other stations not in direct communication with said station.

Each station may be operable to determine the absolute or relative position of other stations in direct communication with said station, and also other stations not in direct communication with said station.

Each station preferably includes a clock and is arranged to transmit clock data in the probe signals, and to utilize the clock data to determine the time taken for the probe signals to propagate between stations and hence the distance between said stations.

The network may include a central timing authority for transmitting updated timing data to the stations of the network, and wherein each station is arranged to synchronize its clock with the clocks of other stations of the network utilizing the updated timing data.

Each station is preferably arranged to accept or reject said updated timing data according to a cumulative error function calculated in respect of the transmission of such data, relative to other prior or simultaneous transmissions of such data received at said station, thereby maintaining a high level of accuracy in respect of the synchronization of clocks at each station of the network.

At least some stations in the network may comprise a station based positioning system or be programmed with position data corresponding to a known fixed location.

Each station may be adapted to determine the approximate distance between itself and other stations utilizing transmission power and/or path loss data in probe signals transmitted between the stations.

Alternatively or in addition each station may be adapted to obtain position information indicating the position of one or more other stations by triangulation.

The network may include a number of seed stations each able to determine its own absolute position with relatively high accuracy, so that other stations transmitting probe signals to and receiving probe signals from the seed stations can obtain absolute position information from the seed stations to determine their own absolute positions, and further stations transmitting probe signals to and receiving probe signals from said other stations can obtain absolute position information from said other stations to determine their own absolute positions.

The data processing means of each station is preferably operable to analyze received probe signals to determine whether or not they are transmitted during optimum peaks of opportunity.

The data processing means is preferably operable to analyze received probe signals by measuring path loss and/or multi-path distortion in received probe signals, and to select probe signals having low path loss and/or low multi-path distortion for extraction of position or timing data therefrom.

The network may include a central authority to define probe channels for the transmission of the probe signals, to reduce interference and prevent jamming or interception of the signals.

BRIEF DESCRIPTION OF THE DRAWINGS

Embodiments of the invention are described in detail in the following passages of the specification, which refer to the accompanying drawings. The drawings, however, are merely illustrative of how the invention might be put into effect, so that the specific form and arrangement of the features shown is not to be understood as limiting on the invention.

FIGS. 1(a) to (d) are schematic diagrams showing known methods of determining distance and position of a station from one or more stations having position information;

FIG. 2(a) showing the general position of the stations at a time $t_0$ and FIG. 2(b) showing the same stations having subsequently gathered up to three close neighbors;

DESCRIPTION OF EMBODIMENTS

Figure 2A:
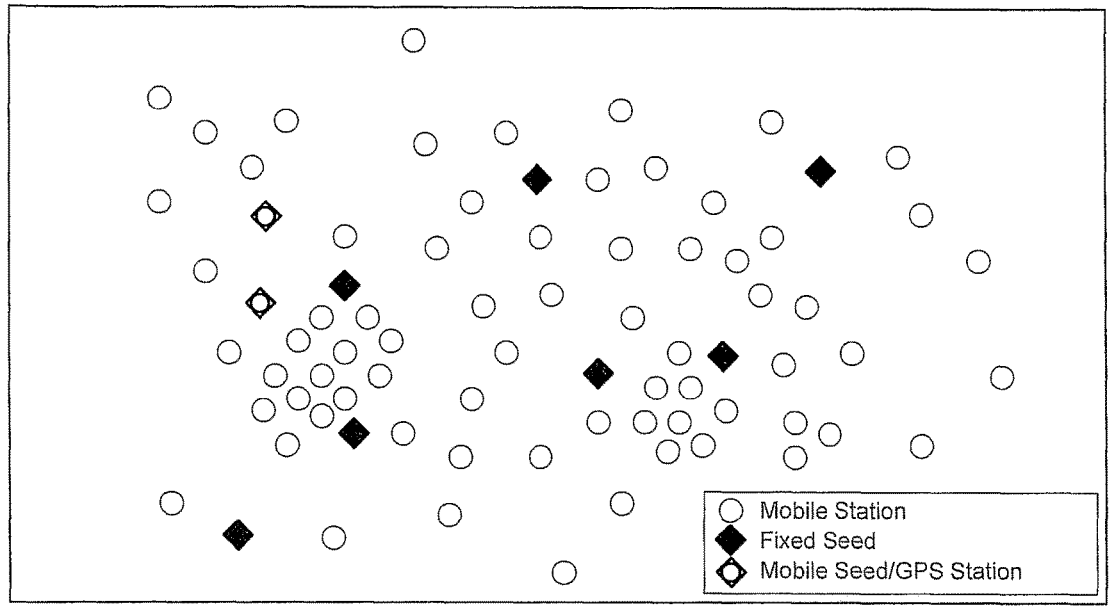
FIGS. 2(a) and (b) are simplified schematic diagrams showing a number of stations operating in an ODMA network.

As stated above, systems for locating wireless mobile stations in a wireless network are generally network based or station based. Network based systems use the information gathered to perform triangulation or trilateration (or similar) calculations to establish the position of stations having unknown locations, typically relative to known fixed absolute positions. Station based systems incorporate other technologies built in to the mobile wireless stations, or that are used in association with the mobile stations, to locate position. Such technologies include Global Positioning System (GPS) receivers, which may be enhanced with the provision of additional ground based stations. However, in practice GPS and the other technologies have certain limitations, the most significant of which is the fact that it may be unavailable in certain topographies, in buildings or underground for example.

Unless otherwise indicated by the context, the term "absolute position" in this specification is intended to refer to a position that is geographically referenced (irrespective of the accuracy thereof, such as a position being indicated with reference to a defined grid or coordinates. For example, absolute position could be defined in terms of a reference position in the x, y and z planes, or in terms of latitude and longitude (and possibly elevation) coordinates. The term "relative position" is intended to refer to a position expressed in terms of the relative distances between, and relative orientation of, stations in the network, with reference to one station or to each other, but without reference to a defined grid or coordinates.

The present invention relates to a network based method of locating and positioning mobile stations, typically for use in an ODMA communication network (of the general kind described in WO 96/19887 entitled Multi-Hop Packet Radio Networks). Some of the stations in the network may have station based positioning systems, but this is not a requirement of the invention.

In order to perform triangulation and related geometric calculations, stations must be able to determine the distances between the stations. There are a number of known mechanisms for determining the distance between two wireless stations in a network environment. These mechanisms include:

signal timing analysis, by measuring the time of arrival (TOA) of signals between the stations which, together with position detecting equipment, enables calculation of the time difference of arrival (TDOA) of signals and estimated position;

angle of arrival analysis (AOA), which measures the angle of the signal between stations; and radio propagation analysis, which evaluates radio frequency characteristics such as frequency shifts, phase shifts and path loss of the weakening signal between stations on the network.

In a radio network, path loss information provides an initial indication of the distance between the two stations through basic and well known radio propagation analytical techniques relating path loss to distance. Thus, if a station hears a probe signal transmission of a neighbor station, the receiving station will determine that the transmitting neighbor is a certain distance away by analyzing the power level of the initial transmission and the noise floor specified in the probe, although the mechanism has limits in accuracy. The degree of accuracy is a function of the distance; being less accurate with increasing distance.

Each station listening to the probing transmissions of other stations and to any responses will have initial information in respect of the distance of other stations from the listening station and to each other (information in the probes and responses). However, if the probe information that is received incorporates information about the listening station itself, in other words, it provides information that it obtained from listening to probes from neighboring stations, then the listening station can make more accurate conclusions about the distance between the stations. If responses are then received, in reply to probing, the responses will provide specific information that will enable very accurate determination of distance through radio propagation analysis techniques or from timing measurements.

Consequently, although the receiving station will not know exactly where it is relative to the neighbor, it will at least recognize that it is within a certain radius of a circle (more accurately a three dimensional sphere) generated by the probing station at a known radius away.

While this may not at first seem especially accurate, if the other station is in fact a very short distance away, this information may well be accurate enough. In an ODMA network environment this will often be the case. For example, two mobile telephone users may be in a crowded room, in which case although the exact position is not available, one user will be able to establish that the other user is at least within a certain distance of the user's own position. In other words, although each user may not know the exact actual position of the other, they will know that they are in the same room and no more than a few meters away.

This concept is shown in FIG. 1(a), where a transmitting station X is a distance x away from a receiving station R. If station X has a known fixed absolute position that it can communicate, the receiving station R will know that it is within the radius x (and therefore in one of the nine grid blocks marked A-C/3-5). If the station X does not have a determined position, R will at least know that it is a relative distance x from X but will not have any position information.

If there are two neighbors of R with known fixed absolute positions, analysis by the receiving station will lead to the conclusion that the receiving station is at one of two possible intersections of the circles defined by the radii from the two stations. This is illustrated in FIG. 1(b), where a second station Y is a distance y away from the receiving station R; leading to the conclusion that the receiving station is in either location B/3 or C/5. Again, if the grid blocks are very small, this may already provide sufficient information for positioning purposes.

If the other two stations (X and Y) did not have absolute position information, and assuming X and Y were not within range to receive transmissions from each other, then R would only know that it was within a distance x and y from X and Y respectively. However, if X and Y were themselves able to pick up transmissions from each other they would be able to establish their relative positions in relation to each other as a vector (distance and direction) irrespective of the ambiguity in the position of R. This concept is expanded upon below in this specification with reference to the present invention.

Known information regarding the region may enable certain assumptions to be made about the likelihood of the station being at one or other of the two possible locations (for example the one location may be a road and the other a swamp). However, it will be understood from the description that follows in this specification that the ODMA slow probing and neighbor gathering processes will also assist in resolving these forms of ambiguity without requiring any actual knowledge of the region or topography.

FIG. 1(c) shows that if a third station Z with fixed absolute position is a calculated distance z away, then the location of the receiving station R can be narrowed down to a fixed absolute point in location C/5, through basic triangulation calculations. Again, if no absolute position information is available at the stations X, Y and Z, then all R will be able to determine is that the stations are within a distance x, y and z from R, respectively. (The positions of the stations X, Y and Z relative to each other could be determined if they could hear each others' transmissions.)

Obviously, the triangulation calculations used in the example of FIG. 1 can also be applied to determine the third dimension of the relative elevation of the stations when an additional station is involved. The use of directional antennas will reduce the number of transmitting stations required for positioning purposes by using angle of arrival analysis. These methods involve known techniques.

FIG. 1(d) shows the wireless station R requiring position information and stations X, Y and Z at respective new positions X', Y' and Z'. At this point the wireless station R is using a new neighbor W from which to determine its position, together with stations X and Y. Station Z could either be out of range (as illustrated) or could be used to provide additional information that would enable the wireless station R to test its position calculations.

It can be seen that in the above explanation a station in an ODMA network can establish its location by obtaining information from the stations that it has established as its neighbors. Alternative methods of determining distance (such as timing probes and responses, as discussed below) may be utilized that provide greater accuracy, but the principles described above will still apply.

In traditional network based position determining mechanisms, a station attempting to establish its position will try to communicate with fixed position beacons that are in range of the station and which have absolute position information. In some more advanced systems, if the station fails to locate enough beacons to determine its position, it may attempt to locate other stations in the region that are themselves in contact with beacons in order to estimate position.

However, this utilization of the beacons as touchstones is not required in the present invention, where the stations do not start by attempting to communicate with beacons, but instead simply start gathering good quality neighbors regardless of the absolute position information that may be around them. Some of these neighbors may well turn out to be stations with absolute position information, but this is not required as such.

When switched on, all a station needs to do is listen for probe signals and probe for neighbors in order to gather and maintain a predefined group of the best neighbor stations available. The positioning mechanism is not dependent on coverage from any base station, fixed position or other datum point. If the neighbor happens to have absolute position information, then the station will itself be able to determine its position very quickly.

For reasons that will become apparent, where a station is activated in a pre-existing network the stations already operating around the new station are very likely to have already established their positions (whether relative or absolute). However, in the illustrated embodiments it will be assumed that many (if not all) of the stations will need to establish position. As stations are not all attempting to communicate with a limited number of stations with position information (as is the case with beacons), the present invention has the additional benefit of not overloading the network with these unnecessary transmissions.

The ODMA-over-wireless methodology is used in a communication network which has a number of wireless stations which are able to transmit data to and receive data from one another. The methodology comprises defining a first probing channel for the transmission of first, broadcast probe signals to other stations. Other stations which receive the first probe signals (also referred to as "slow probes") from a probing station indicate to the probing station their availability as destination or intermediate stations. A neighbor table comprising details of, and connectivity data relating to, these other available stations is maintained at each of the stations.

In an ODMA network utilizing a wireless medium, when there are a number of stations in close proximity they will end up probing at higher data rates and lower transmit powers. Listening stations will occasionally respond to stations that are probing at the lower data rates, or that do not have enough neighbors, to help any lonely (distant) stations (also referred to as "lonely neighbors") that cannot use the higher data rates or do not have sufficient neighbors. Stations will only use the lower data rates when they are lonely and cannot find sufficient neighbors at the higher data rates and at maximum power.

ODMA networks utilise two kinds of probing processes, "slow probing" and "fast probing". The slow probing process is used by each network station to gather neighbors, while the fast probing process is used to construct gradients between originating and destination stations.

Each station will transmit slow "neighbour gathering" probe signals at regular intervals (determined by a Slow Probe Timer) trying to find other stations. Stations indicate in their slow probes that they are able to detect other stations probing and in that way stations will vary their probe power until a certain predetermined number of stations indicate they are able to detect the probes. If a station never acquires the required number of neighbors it will remain at the lowest data rate and maximum transmit power.

Each station will randomly vary the Slow Probe Timer slightly between slow probe signal transmissions to avoid collision with other stations. Should any station start receiving another station's transmission, it will reload the Slow Probe Timer with a new interval.

In a wireless network of mobile stations the stations are constantly moving, and as such the number of neighbors will constantly be changing. If the number of neighbors exceeds the required number, a station will start to increase its data rate on the probing channel. It will continue to increase its data rate until it no longer exceeds the required number of neighbors. If it reaches the maximum data rate it will start to drop its slow probe transmit power by small increments until it either reaches the minimum transmit power, or no longer exceeds the required number of neighbors.

When a station replies to another station's slow probe on a Probing Channel it will limit the length of its data packet to the Slow Probe Timer interval. This is to avoid other stations probing over its reply. If the station that is replying has more data to send than will fit in a small packet it will indicate in the header of the packet that the other station must move to a specific Data Channel.

There can be a number of Data Channels defined for each Probing Channel. The station that is requesting the change will randomly select one of the available Data Channels. When the other station receives the request it will immediately change to that Data Channel, where the two stations will continue to communicate until neither of them have any data to send, or if the maximum time for remaining on the Data Channel expires (set by a Data Timer). Alternative data transport protocols could also be used.

When a station changes to the Data Channel it loads the Data Timer. It will remain on the Data Channel for as long as the Data Timer will allow. When the Data Timer expires the stations will revert back to the Probing Channel and start probing again.

The slow probing process consists of three basic functions:
1. Neighbor collection
2. Power learning
3. Ramping of neighbors The process of neighbor collection consists of a station probing at increased levels of power until neighboring stations indicate in their own probes that they are detecting the probes of the first station. The power of the probe is increased until a predetermined number of neighbors indicate that they are detecting the probes.

All probing stations increase and decrease their probe power until all stations have collected a predetermined number of neighbors. This process consists of increasing and decreasing the power level of probes and indicating in probes which other stations' probes are heard. In this way all stations can learn what power level they require to reach various neighbors.

Each time a station probes it indicates its transmit power and noise floor and which stations it has as neighbors. Every time a station hears another station probe it calculates from the probe the path loss and power required to reach the station from the path loss and the noise floor of that station. The path loss to the neighbor and the power required to reach the neighbor are stored in the neighbor table kept at each station. If a neighbor is no longer heard then the path loss and power level required to reach the station are increased or "ramped" in the table until a certain level is reached at which point the neighbor is removed from the neighbor table.

If a station has a message (or other data) to transmit to a station that is not one of its neighbors, for example, a distant station across the network, it begins to transmit fast probe signals (or gradient gathering probe signals) to develop information on how to reach that station. The information is called a gradient and is an indication of the cumulative cost to reach a destination station. When a station starts to fast probe it indicates that it is looking for a destination and neighbors hearing the fast probe will themselves fast probe until the destination station hears the fast probes of its neighbors. The gradient is then built through adding cumulative cost until the gradient reaches the source, and the source can commence to send messages to neighbors using the information developed in the gradients to destination, which in turn can send them to their neighbors until the destination is reached.

Each station keeps a record of the (cumulative cost) gradients to each destination of each of its neighbors, and its own gradient to the destination. In standard ODMA communications, each station only passes messages to stations with a lower cumulative cost to destination. A station can pass a message to any of its neighbors with a lower gradient to destination. Neighbor gathering via slow probing and gradient generation via fast probing allow a station to develop a number of choices of stations with lower cost to any destination that can send messages to such destinations. The neighbors are maintained all the time via slow probing and gradients are only developed on a needs basis when messages/data needs to be sent to stations that are not neighbors.

The ODMA methodology, particularly with regard to the use of neighbor tables and gradient tables, is described in detail in WO 2005/062528 entitled Probing Method for a Multi-Station Network. In the present invention the fast probe process described in that document could be used in a similar manner to define a position gradient or distance gradient through levels of neighbors with highest level of confidence in respect of position determining accuracy to the destination, based on defined position-relevant cumulative error functions.

The probing process provides a considerable amount of information about the neighbors of each station—and indeed about the neighboring stations of each of the neighbors. In the present invention, the identification and maintenance of good quality neighbors is a key element in determining the accuracy of the positions calculated and consequently the ODMA neighbor gathering process through slow probing is the primary mechanism used to assist in the locating and positioning of a wireless station in the ODMA network. Each wireless station uses the slow probing process to identify and obtain information from the station's neighbors. A station is considered a "neighbor" in this sense if it has been heard to transmit a neighbor gathering probe message, and details of the neighboring stations identified will be maintained in each station's neighbor table.

If an identified neighbor has itself transmitted a neighbor gathering probe message that is received by a particular station, and the probe contains information of the particular station's own identifier, then the neighbor is flagged as a "detecting neighbor" in the neighbor table. Typically each station will adapt its neighbor gathering techniques (generally by increasing data transmission rates and by powering down the strength of the probe signals sent out) to maintain approximately 10 detecting neighbors. Of these, a predetermined number of the neighbors with the lowest path loss are flagged as "close neighbors" (for example, five stations). The information obtained from close neighbors may be treated differently or preferentially and the techniques used to transmit the information may also be adapted depending on the neighbors.

If a station is unable to acquire the minimum number of close neighbors when it is transmitting on full probe power, it is referred to as a "lonely neighbor". Other stations that have acquired the required number of close neighbors that can detect the lonely neighbor transmissions will let the lonely neighbor know that they are detected, and may provide additional information to the lonely neighbor.

When not probing or sending other messages, each station is listening for the probes of the other stations. When heard, the receiving station can use the transmit power information provided in the probe to establish the path loss to the station. As each station is constantly identifying the close neighbors with the lowest path loss, these neighbors are likely to be either in direct line of sight, or have the best signal with least interference.

Even stations merely able to listen will be in relatively good connectivity with a probing station in a fully operational network with many stations, as stations sending probes will likely have powered down their transmission levels in order to minimize their number of neighbors. In other words, neighbors are typically chosen for the quality of connectivity. Lonely neighbors are the exception, but will be recognized by the stations (hearing their full power transmissions and determining that they have less than the required number of collected neighbors) and assisted.

Furthermore, the broadcast probes can include information of the broadcasting station's close and/or detecting neighbors. This enables the stations listening to the broadcasts to know the positions of the neighbors and this facilitates scavenging of additional information. Indeed, the listening station could even probe specific stations from the information derived in this manner if required.

By analyzing the information available at a station it should be clear that some simple assumptions can be made from path loss and signal strength information. If there is a very low path loss, it is likely that the stations are in direct line of sight (without any reflected signals). In such an instance, the distance between the stations can be determined with relatively high accuracy. This will provide a "raw" determination of distance and position. The slow probing methodology gathers this information in the ordinary course of operation of an ODMA network, together with information regarding any delays. The strongest signal is generally the direct signal although there may be unusual circumstances where this is not the case. It will be seen below that this form of potential ambiguity will be recognized and resolved due to the mobility of the stations.

If path loss is high, assumptions can be made about the environment—for example there could be interference, barriers (such as buildings) or the stations might simply be far apart. If a delay is registered, assumptions can be made that there is a reflected or deflected signal. As there are likely to be several neighbors in an ODMA network, it should be possible to establish position from several independent sources and verify information from other stations, and thus errors caused by distance calculations based on reflected or deflected signals can be obviated.

Depending on the distance, different power and modulation techniques may be utilized. If stations are close by, sharp broadband pulses can be transmitted from which distance and position can be very accurately established. While wide spectrum or broadband signals allow higher data transmission rates, the signals become blurred over increasing distance unless the power is increased. Modulation techniques may improve these problems to some extent, but to travel greater distances a narrowed bandwidth at lower data rates and increased power is required. The probing methods used in the ODMA communications already adapt these characteristics to optimize transfer of data, and can also be used to enhance positioning calculations.

In addition to their use in estimating the distance between stations from the path loss and signal strength characteristics, specific probes may be sent to neighbors to obtain timing information relating to the time taken for the probe signal to travel from the one station to the other and back again. Provided that each station has a very accurate clock incorporated in the unit, the times taken for the probe to be sent to another station (the delta time), then to be processed at the receiving station and then to be returned, can be used to calculate distance using the speed of light (also being the speed of propagation of radio signals).

In the ODMA environment, a probe signal may be sent out to any neighbor identified in the neighbor gathering process, with the probe incorporating a timer. This probe may be separate and distinct from the neighbor gathering probes, or the neighbor gathering probes may contain the timer so that the neighbors listed as close neighbors will respond. On receipt, the neighbor records the time the probe is received and the time when the reply is returned after processing. Whether the probed station returns the actual times of receipt and sending of the response, or that station simply returns just the processing time as such, it should be evident that by excluding the processing time at the probed neighbor station, the probing station can calculate the time taken for a radio signal to reach the neighbor and return (in other words, twice the distance between the stations). The speed of light is approximately $3.0 \times 10^8$ m/s, so if the calculated time for a signal to reach the neighbor is 1 µs the distance between the stations is 300 m.

Consequently, for location and positioning purposes, in addition to the characteristics of general purpose neighbor gathering probes required for ODMA communication, clock or timing information can be placed in the probe with the unique ODMA identifier/address of each known neighbor. Each station will hear broadcast probes from immediate (close and detecting) neighbors and independent clock or timing data will be sent back to each of the probing neighbors. In this manner, both the sending and receiving neighbors will have ongoing information regarding their relative distances from each other and will be able to maintain the accuracy of their relative positions.

As accurate transmissions are required for time-based positioning techniques, short transmissions with accurate time datum points are necessary. Well defined sets of bits in the transmission start the clocks at the respective stations when the sets are picked up in the probe and again when sent back to the probing station, with an injected unique bit sequence in the transmission effectively acting as a trigger. This requires sophisticated hardware control, but enables the very fast responses of the digital clocks available to start counters and measure time very accurately.

When a probing station sends a transmission, the specific bit sequence triggers the probing station's clock to start, and the probing station then waits for a response. The unique bit sequence is then picked up at the probed station, which starts a clock at the probed station that measures the turnaround processing/delay time after receipt of the trigger at this station, until the probe response is sent back to the probing station. When this occurs, the trigger bit sequence is again set, and the turnaround time is reported in the transmission. On receipt of the transmission at the probing station, the trigger bit sequence stops the clock at the probing station, which subtracts the turnaround time at the probed station as reported; and consequently the duration of the round trip (excluding the processing turnaround time) is known. From this information the station can calculate the distance between the stations.

As illustrated above, the stations do not necessarily need to have a universal clock to determine distances between them, but it would be possible to update and synchronize all the stations from one especially accurate clock on an ongoing basis if this is desirable. To achieve this, a time transmission could be sent out from a reference station acting as a central time authority to provide each station with the exact time.

It must be appreciated that a transmission could have been received over a particular hop that had poor connectivity, in which case there will be some uncertainty regarding the setting of the clocks' time and the timing that is calculated for distance determination. The lack of timing accuracy or of synchronicity of the stations' clocks, or poor transmission quality, can all contribute to an inaccuracy factor. This inaccuracy factor is an error function that is a form of cost function associated with each hop. These error functions can be aggregated over multiple hops as the transmission progresses, which provides an indicator regarding the certainty (cumulative error function) of the calculations based on the information derived.

In order to reduce the effect of drift in the determination of the time taken over multiple hops, the time delay (caused by each station processing the communication) for each hop is determined. As stations will not necessarily know how long it took for the message to arrive, a probe could be sent to the reference station and, from the response received, the station updating the time will be able to calculate the delay. This information could be incorporated in the actual time set for synchronization purposes at each station. A station could obviously also request the correct time from the reference station and then time the delay in receiving the response.

The time synchronization could be performed via many hops from the central time authority, and this synchronization could be revised at regular intervals or on an ongoing basis to minimize the effects of clock drift. In order to achieve this, time updates could be radiated out by the central authority and broadcast to the stations on the network using the gradient updating techniques described in WO 2005/062528 entitled Probing Method for a Multi-Station Network, referenced above.

As the central authority radiates out the clock updates, stations receiving the time or clock update data could choose to accept the update if the cumulative error or cost function is better than that received in a previous update. In other words, if the level of uncertainty regarding the integrity of the transmission is determined to be worse than that of earlier updates, the information could be disregarded in favor of the older information which is considered more accurate. The cumulative cost function description disclosed in WO 2005/062528 is relevant in the application of this invention as well. Obviously, a transmission with time update information received over one very long hop may well have a higher cost function than a transmission over several hops of good quality. Consequently, where a transmission may be made over two potential routes, the path with the lower cumulative cost will be preferred as the distance determination will be more accurate. Therefore the value of any distance calculations can be prioritized based on the aggregated cost over the hops, or in terms of the number of hops required, or both.

To counter the effects of the inaccuracy and the increasing error/cost function, each station can ascertain whether the clock available at the proposed receiving station is more or less accurate than the clock at the transmitting station. As all the neighbors are passing their clock data between them, the possibility of looping must be avoided (in other words, when an update is received that was initiated by that same station). WO 2005/062528 describes techniques for preventing this looping through "freezing". Essentially, to avoid the loop, a counter will be initiated in the probes that will register the number of times the updated timing data has been passed between stations, thereby enabling each of the stations to recognize how up to date the timing information is, so that the use of less accurate timing information is avoided.

It will be appreciated that the maintenance of an accurate local clock at each station greatly simplifies distance calculations. The level of accuracy required in respect of the distance calculation will dictate the level of accuracy required in respect of the clock. By way of illustration, if a resolution of 30 m is required, the clock must be accurate to 0.1 microseconds (100 nanoseconds).

The operation of the network as a whole is also simplified considerably if all the stations have local clocks with synchronized times. In addition to the improved determination of distance, the synchronicity of the clocks provides other benefits. For example, communication is potentially more effective if stations hop between frequencies to different channels, as this avoids interference. However, the communicating stations must move channels simultaneously, or in a predetermined sequence, for this to be effective. If all the stations involved have synchronized clocks, then this form of communication is possible over the network.

Moreover, synchronicity facilitates the provision of services and network management in absolute time, enabling the central authority to request that certain stations move to certain channels at certain times in order to receive information, such as software or security updates, etc. Again, this would minimize interference in the network as a whole and additionally improve privacy. Hopping channels could take place in response to a schedule (which could be determined randomly by the central authority and communicated in encrypted form to the stations) and this form of control is obviously an important consideration in network management and for service quality levels. However, to be effective, all the stations involved must be capable of reacting accurately when required to do so.

Regardless of whether the distance between stations is calculated from signal timing or propagation analysis (or any other analysis over the air interface), the other stations may provide position information to some stated level of accuracy. Position information could be provided as x/y/z coordinates on a predefined reference framework, or simply as latitude and longitude (to degrees, minutes and seconds), calculated from position reference datum points (determined through GPS positioning systems, for example, together with a means of establishing elevation if desired). Any suitable referencing, map, grid or co-ordinate system may be utilized.

As the ODMA process makes use of "peaks of opportunity", it is possible to select probe signals that have low path loss, low multi-path distortion and "high quality" in terms of measurement distance capability or in the time synchronization. (Peaks of opportunity arise where peaks in the signal strength or signal-to-noise levels are identified by monitoring physical characteristics of received signals or by monitoring bit error rates as a function of time, so that transmission power between stations can be reduced, which reduces interference and reduces the necessity for the retransmission of messages. These peaks may be due to factors such as variations in signal path amplitude, frequency or phase variation, noise or interference, multi-path effects, etc.) If these probe signals using peaks of opportunity in terms of distance calculation are used, then the distance measured is considerably more accurate. Consequently, it should be appreciated that not every probe signal need be used, but rather those probe signals sent at optimum peaks of opportunity should be used. This would be especially applicable in very simple single hop situations.

It will be appreciated that the probing channels used by the stations could be changed as well, upon request or in accordance with a predetermined schedule for this purpose. This would reduce interference and prevent any third party attempts to block or access the signals. Moving the channels over which the probe signals are transmitted makes it more difficult to jam or intercept the signals. Therefore the signals are more secure and private. As stated above, the changing of probing channels requires accurate timing.

Ultimately, the distance calculations required involve fundamentals of simple geometry. In the ODMA network, among the many subscriber stations, there is a relatively small proportion of wireless "seed" stations that are interspersed within the region being covered. These seed stations are not points of access or base stations that may be provided in more typical wireless networks, like cellular telephone networks or other networks providing cells of coverage around one or more base stations or nodes. Seed stations are simply stations that are made available for use as intermediate relaying stations where necessary and are typically placed at fixed positions (on lamp posts and on the roofs of buildings, for example) to assist in the opportunistic routing of messages between wireless stations. Seed stations are not fixed infrastructure of the network and may even be removed when there are sufficient other stations in an area.

Seed stations in the ODMA network are, to all intents and purposes, just like other wireless stations except that they are not used by subscribers and generally remain stationary. However, there is no reason preventing seeds from being moving stations, located on trains or vehicles, for example. Although not essential, it is intended that most (if not all) seeds will either be provided with data defining their absolute position, or will have a means of determining their position to some degree of accuracy. This would enable the surrounding stations to establish their positions relative to a fixed absolute datum point (although this does not necessarily need to be a seed station).

In order to provide accurate positioning information, and depending on their location, the seeds may incorporate station based positioning systems themselves (such as a GPS system, which may be useful if they are intended to move) or they can be loaded with information from a positioning determining device (such as GPS) at the time of installation. However, due to the constant re-evaluation of position in the general ODMA network system, a fixed seed will gradually develop position information that should prove considerably more accurate than may be afforded through the standard station based GPS positioning system. This information could be provided to a central authority, which could authenticate the accuracy of the absolute position of the station for use by the other stations on the network.

There may also be other stations in the ODMA network that incorporate other station based positioning hardware. For example, GPS receivers might be provided in certain subscriber telephones and other devices. The above described absolute "position enabled" fixed seeds and any other independently "position enabled" stations, which can be referred to as "mobile seeds", will help to provide the initial "accurate" absolute positioning information, as wireless stations are first added to the network. Although many wireless stations may initially be well out of range of the stations having absolute position information, it will become evident from this description that the network will grow and share this information in a manner that will eventually (typically quickly) encompass almost all, if not all, the stations on the network.

In much the same manner as described with reference to the prevention of drift in the accuracy of the clocks above, it may be possible to have one or more extremely accurate datum points for position reference purposes, from which other stations can confirm their position with extreme accuracy. The determination and containment of cumulative error functions with respect to the position will also operate in a substantially similar manner, with each station utilizing the highest quality of position information with least error.

Each of the stations in the ODMA network will begin gathering neighbors through the slow probe process. In doing so they will each quickly establish whether there are any neighbors that have absolute position information. This information may be provided in the probe together with the station identifier. Some of these stations may be significantly further away or have a poorer quality of connectivity relative to the other neighbors. However, there may be other stations among a station's neighbors that are in a better position relative to these absolute positions.

It should be clear that the closer one station is to another, the less the error that will be incorporated in calculating the distance through the techniques referred to above. The greater the distance of the hop traveled by the signal, the greater will be the error function. If there are many stations that are closely located with accurate position information, then other stations will be able to establish their positions relative to these stations with great accuracy. Consequently, even if information about a station with a determined position that is far away is passed through several short transmission hops or steps (each intermediate station directly or indirectly assessing its own position relative to the station identified as having a determined position, and from others that may be within its group of gathered neighbors), as each hop is small there is minimal error passed on to the station that is attempting to establish its location. This is because many small hops of good quality with excellent position information provide far more accuracy in determining position than one bad quality hop with poor information. As each station gathers more neighbors with fixed absolute position information, each station can test the quality of its information against information acquired through entirely different sources; and gradually the positioning will become increasingly accurate.

It should also be apparent that the neighbor stations will quickly be able to determine their relative positions to each other, even where their positions may be uncertain geographically. When information is received that enables one of these stations to verify its actual position, all the other stations will be able to establish their own geographic positions almost immediately due to their prior determination of relative position. In certain circumstances, relative positioning may be all that is required. For example, two people wishing to meet up in a large park may not need to know details such as latitude, longitude and elevation—they simply need to know how far to walk and the direction to be taken in order to meet up. In other words, all they need is the vector comprised of distance and direction.

Alternatively, a station may only wish to know where certain other stations are relative to each other, while not requiring absolute position, or even position relative to the original station as such. For example, a father may merely wish to be sure that his wife and child are constantly close together, or a police dispatcher may require confirmation that police personnel are not separated from their firearms or from their vehicles. Indeed in an emergency situation it may only be important to know the relative position of the station requiring assistance from the emergency personnel available.

In summary, positioning information may be required in respect of the absolute position of one's own station; or the absolute position of other stations; or the relative position of one's own station to another station; or of another station's relative position to other stations. Of course, absolute positioning knowledge enables relative position knowledge automatically, while the reverse is not true. In any event, all of this position information may facilitate the provision of all the location based services and applications that are available.

In an ODMA network, it must be appreciated that many stations may be mobile and will be establishing their locations from other stations that are themselves mobile. Intuition would suggest that a particular station attempting to establish its location may well be several hops away from a wireless station with a fixed position (relative or absolute) or from an absolute position that is established independently of the network (stations with GPS or other positioning devices). However, in an ODMA network the positioning mechanisms are also dynamic with "growing connectivity"—where any stations initially having unknown location ultimately become "engulfed" by the position information gathered by the stations determining their own positions. The network station position information "crystallizes" iteratively across the network. In addition, not all stations will be moving all of the time, so any station attempting to establish its position will probably utilize information received from stations that are known to be stationary as these will be considered more stable and reliable.

Some stations may need to be patient and wait for their neighbors to establish their own positions; but it should be evident that as neighbors are gathered on an ongoing basis, the information necessary to establish position will become increasingly available across the network. This will mean more and more stations will have sufficient information to update their own position and pass on information to assist others. If necessary (and certainly at the initial stages) the stations can ramp up their probing signal strength to have a better chance of identifying a neighbor further away that may have position information, in order to obtain the necessary initial information, and then power down again once an indication of position is established.

The iterative, crystallizing nature of the process is illustrated in a very simplified and merely indicative form in FIGS. 2 and 3. In FIG. 2(a) a geographic area of the network is represented, having a number of users. Some users are represented as being closely populated, others are spaced further apart. There are several fixed seeds in the area with position information and some mobile seeds, or stations with positioning devices, although it will be appreciated that the number of initial stations with position information, whether fixed or mobile, is low relative to the total number of stations.

Figure 2B:
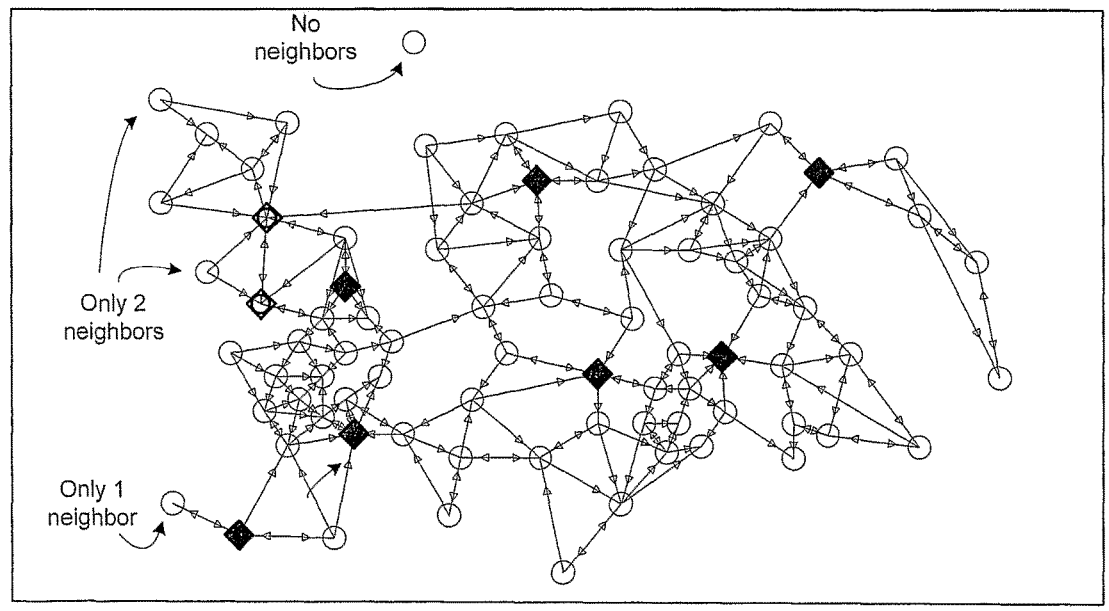

The first step in the process is for the stations to gather neighbors and this is illustrated in FIG. 2(b). In the example illustrated, each station aims ideally to develop only 3 close neighbors, although it will be evident that certain stations (some of which are indicated) have established less than the minimum at this initial stage.

FIG. 3 shows the same network illustrated in FIG. 2 over time. At time $t_0$ (as shown in FIG. 3(a)), none of the wireless mobile stations in an area have location information from the network. However, there are several fixed seeds interspersed throughout the area and there are also some mobile seeds, or mobile stations that have independent positioning systems. At time $t_1$ (FIG. 3(b)) several stations have successfully developed position information from the seeds and the stations with known positions according to a first embodiment of the invention. Notably, stations in more densely populated areas determine some form of position (relative or absolute) more quickly. In FIG. 3(c) many of the stations that had only determined relative position before now have neighbors with absolute position that enables these relative positions to very quickly become absolute.

Figure 3A:
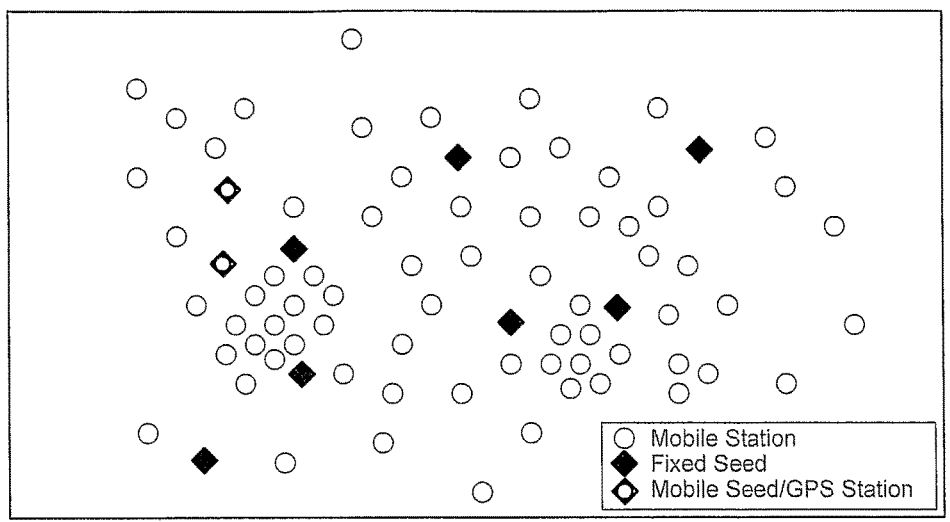
FIGS. 3(a) to (e) are simplified schematic diagrams showing the same stations as in FIG. 2, the sequence represented in FIGS. 3(a) to (c) illustrating the stations gradually determining their positions at times $t_0$, $t_1$ and $t_2$ respectively according to a first embodiment of the invention; and in FIGS. 3(d) to (e) according to a second embodiment.
Figure 3B:
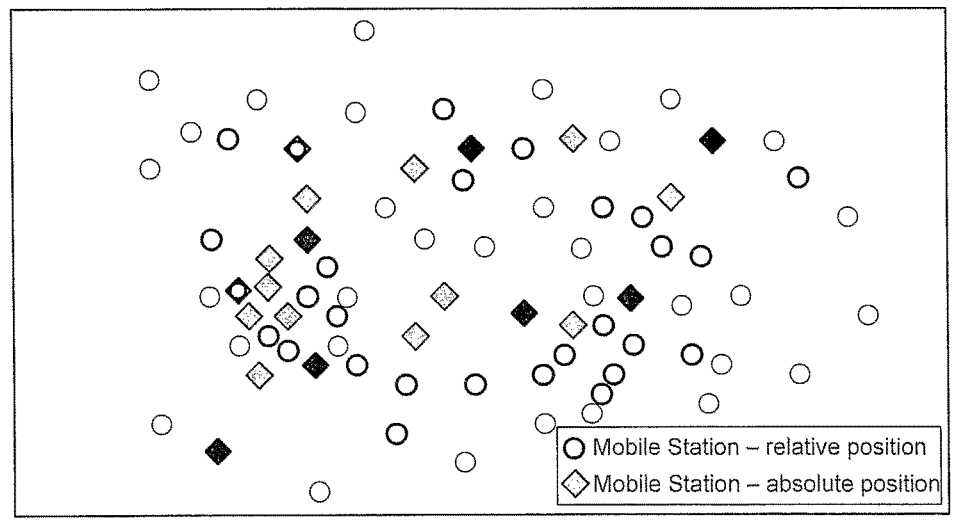
Figure 3C:
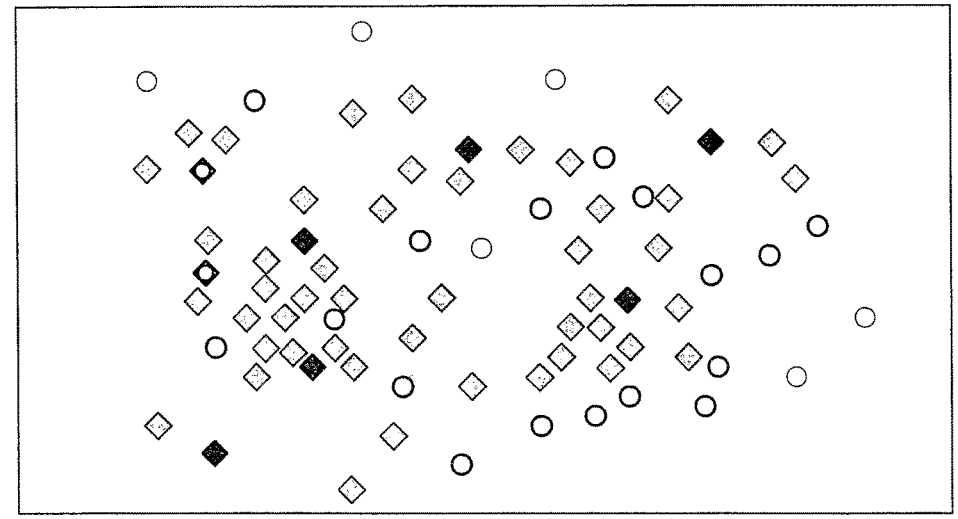
Figure 3D:
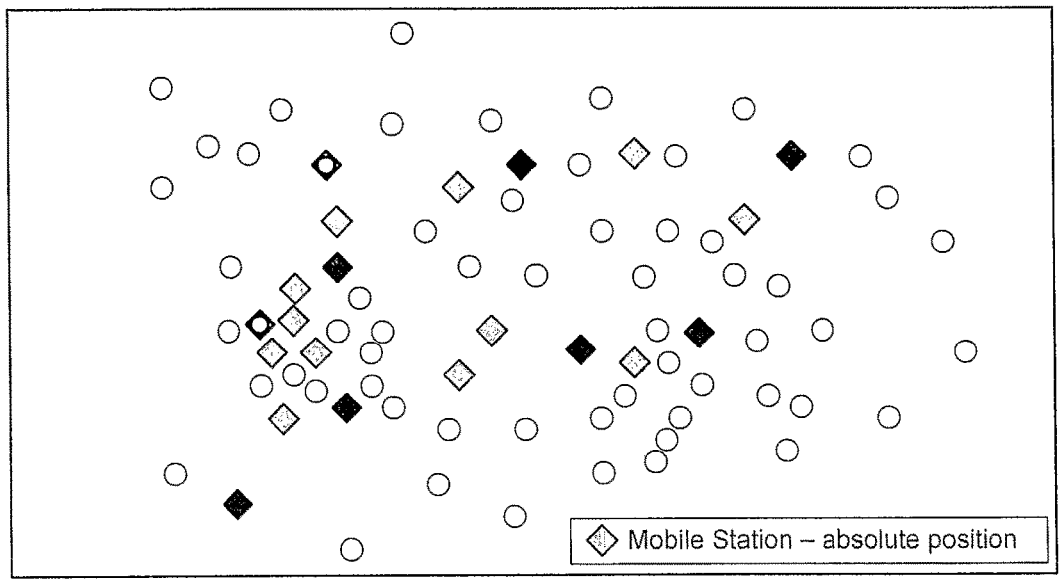
Figure 3E:
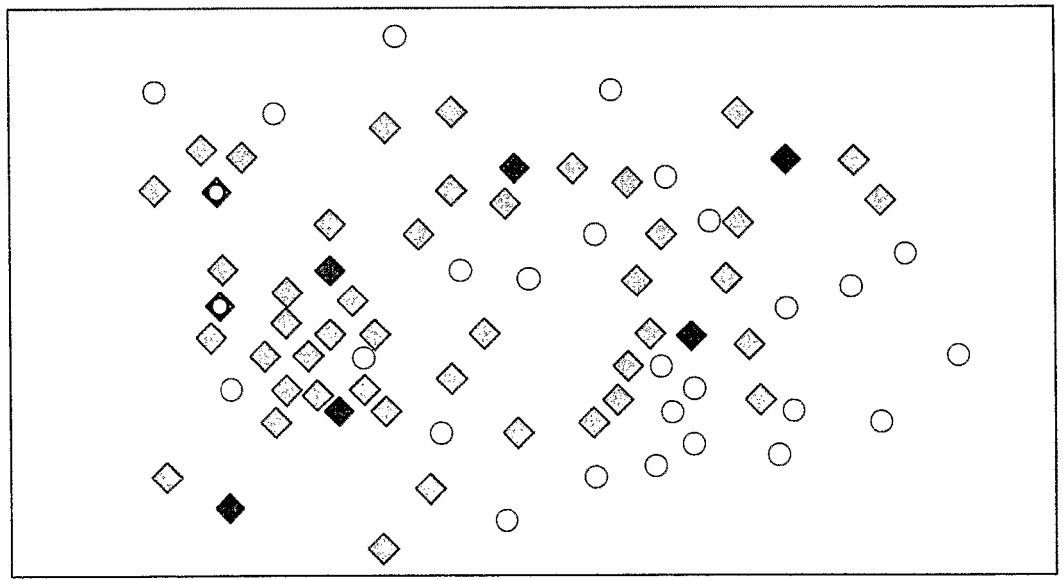

FIG. 3(d) shows time $t_1$ for position determination according to a second embodiment of the invention. Here only absolute position is determined. As more and more stations are able to establish their positions, other neighboring stations will also be able to determine their own positions and the number of stations with known positions will grow iteratively and exponentially as is shown at time $t_2$ (FIG. 3(e)).

In both of the illustrated crystallization mechanisms illustrated, ultimately, all of the stations on the network that are able to locate neighbors will be capable of establishing position to a greater or lesser degree of accuracy—then reassessing information and refining position as updated or alternative information is made available. Even lonely neighbors, unable to develop the minimum number of neighbors, may be provided with information from the other stations to establish their position (unless completely outside propagation range). However, depending on the distance, the quality of information may be relatively poor and consequently less accurate.

Figure 4A:
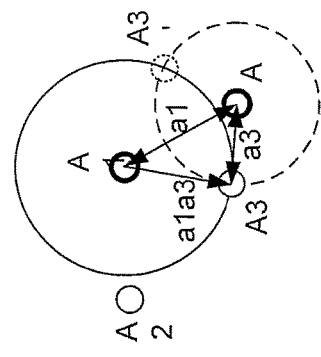
FIGS. 4(a) to (e) are schematic diagrams illustrating distance and position determining techniques utilized in accordance with the first embodiment of the invention.
Figure 4B:
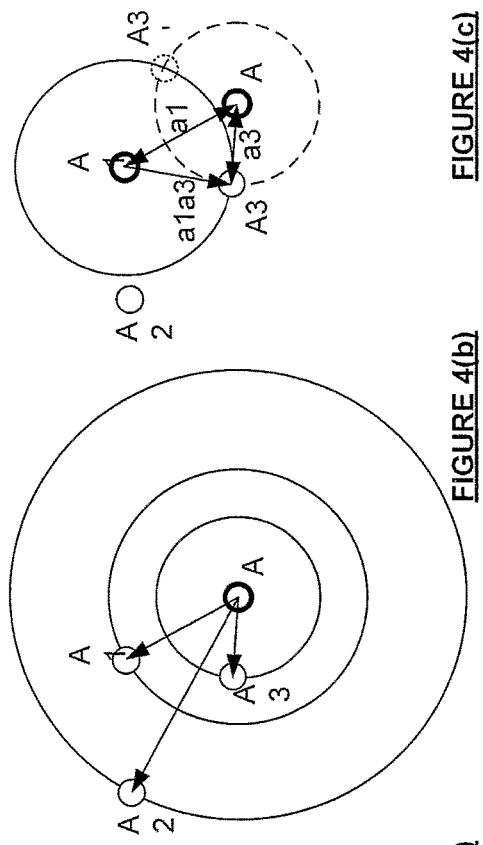

FIG. 1 described a situation where three stations with known position could communicate their absolute positions to a station R and from the three sources of position information the position of R could be established. However, if R could only hear the transmissions of the three stations, but did not receive absolute position information, then all that R could conclude is that the other stations are each a certain distance from it. This principle is illustrated in FIG. 4(a), where a station A can receive the transmissions (or may have probed and received responses) of three neighbors A1, A2 and A3, thereby determining that these stations are all within certain "orbits" of A at distances a1, a2 and a3, respectively. However, station A would not be sure where on the orbits the stations are located. FIG. 4(b) indicates where the stations are actually positioned relative to each other, but none of them can determine this initially.

Figure 4C:
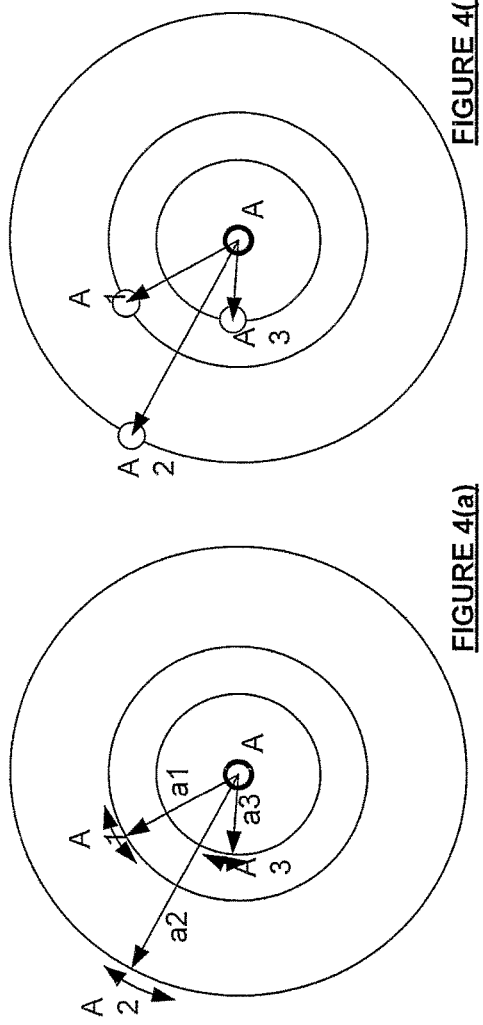
Figure 4D:
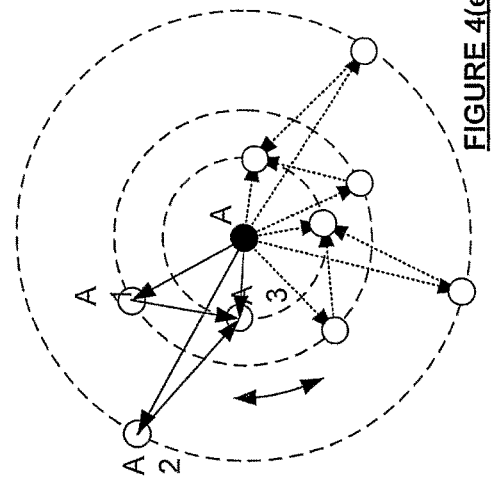

If all the stations illustrated could hear some or all of the probes from the other stations, or share information with each other, then more conclusions can be drawn about their relative positions. This is the primary concept of a first embodiment of the present invention, the mechanism of which will now be described with reference to FIGS. 4(c) to 4(e). In the ODMA technology, each station gathers and maintains neighbors; in the example of FIG. 4 station A has gathered three stations. In FIG. 4(c), it is apparent that A1 shares A3 as one of the neighbors that it has itself collected. In the example, A1 could have gathered other neighbors (in addition to A3) that may or may not include A and/or A2, as each station in the network will be identifying and collecting its best possible neighbors; and while A1, A2 and A3 may be best for A, other stations may well be better for A1 (although here A3 is shared).

In any event, in ODMA each neighbor will share information in respect of its collection of neighbors maintained in its tables, so A1 will know from A that A3 is one of A's neighbors, and A1 will also be able to establish from A that the distance between A and A3 is a3. A1 will also have been told its distance a1 from A and A1 will consequently be able to determine that the distance between A1 and A3 is a1a3 by triangulating. A3 will be receiving information from both A and A1 (as it is a close neighbor of both stations) so regardless of whether A or A1 are its own collected neighbors, it will know all three distances as well. Consequently, all three stations know their relative distances from one another, and although A3 could be at A3' (an ambiguity), A1 and A can establish both distance and relative direction—in other words there is a relative vector between them (these stations are shown in bold and now have relative position information). It should be appreciated that in this initial triangulation, the calculation is made based upon highly accurate information that is shared.

FIG. 2(d) shows A2 has also gathered A3 as one of its neighbors. As described above, this means A2 and A can determine a vector between them despite the ambiguity of A3's possible position at A3". However, because the actual distance between A1 and A3 is known by A, it is clear now that A3 can only be in one place, so A3' and A3" are discarded. In other words, the shared information between the neighbors has enabled A to resolve the ambiguity and this can be communicated to all of A's neighbors in the nest probe (which will pass the information on to their neighbors). However, all that has been determined with great accuracy at this stage is relative position (shown in bold), For station A this means that the cluster of stations still orbit around it as illustrated in FIG. 2(e), but at least it is in a fixed orientation or "constellation" at this point in time. In reality if the cluster chooses to appoint one station as a datum point (e.g. 0,0,0), then the stations can all describe each other with relative bearings but they actually operate in relative orientation in an undefined three dimensional space.

Figure 4E:
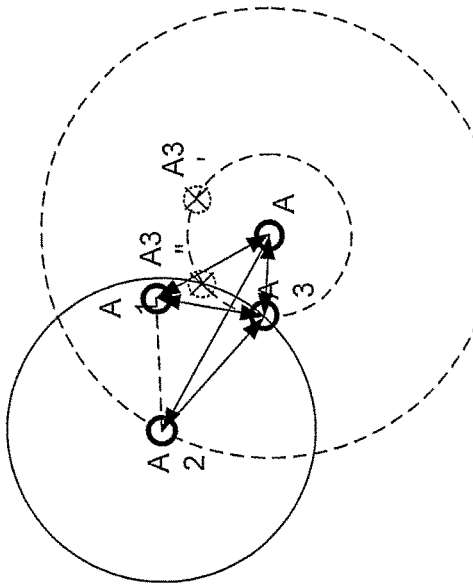

This is shown in FIG. 5. FIG. 5(a) illustrates that Station A and its neighbors in FIG. 4 are in fact orientated in three dimensions relative to each other. FIG. 5(a) shows that the cluster described in FIG. 4(e) is actually rotatable and moveable in any plane (the cluster is illustrated in various possible three dimensional orientations relative to the absolute point at A). FIG. 5(c) shows that there may be a more complex three dimensional relationship with additional stations, but in the figure point A and B are now know absolutely in the space. With two positions fixed, the entire arrangement that had been only defined relatively is now fixed to a greater degree, but is still rotatable around an axis as indicated in FIGS. 5(c) and 5(d). If an additional point C is fixed absolutely, in FIG. 5(e) then the positions of the entire three dimensional structure is fixed absolutely and every other nodal station can now be fixed absolutely. In the present invention, each station will have the information of each neighbors' station so this information will be distributed through the network with minimal additional probes.

Figure 5C:
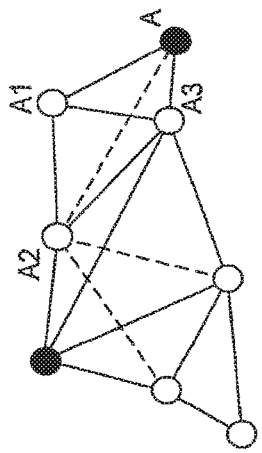
FIGS. 5(a) to (e) are schematic diagrams showing developments of the concepts illustrated FIG. 4, in a three dimensional orientation.
Figure 5D:
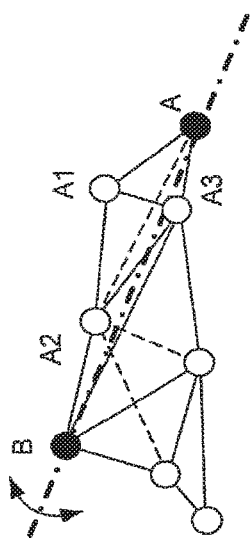
Figure 5E:
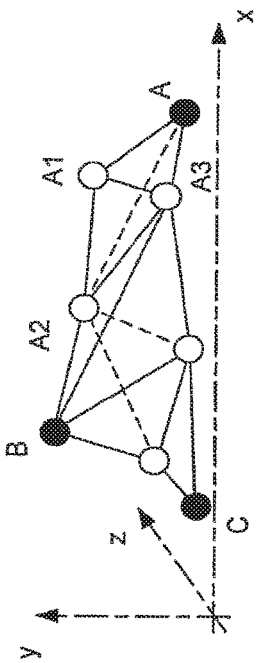
Figure 5A:
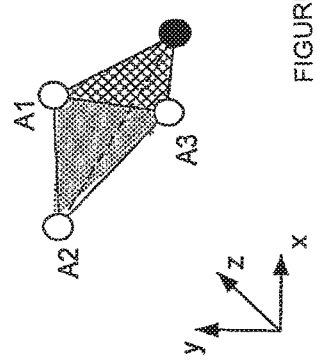
Figure 5B:
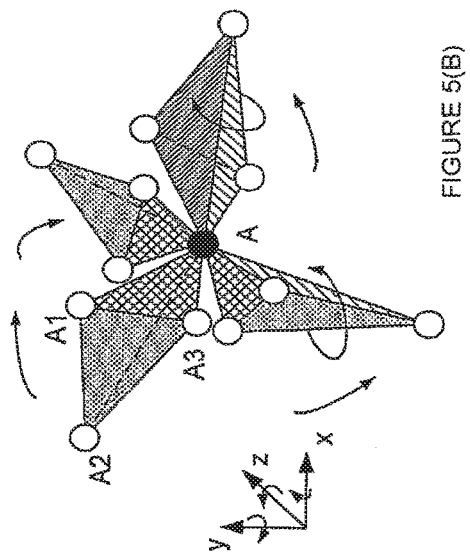

It should be understood from FIG. 5(c) that the absolute position information that is initially available to stabilize the overall position determination in the network can be many hops away from the station attempting to fix its absolute position. As this information is relayed over high quality hops, and as the relative positions can be established with great accuracy, the accuracy of the positions communicated across the network is inherently precise. The above description has illustrated an apparently static network for simplification of the explanation. The invention must not be understood as being limited in this respect as in reality, the invention contemplates a dynamic network of mobile stations.

It must be appreciated that, even in a highly mobile environment, the positioning process can be very accurate if the probing mechanism is undertaken many times a second. Thus, if a first station requires position information relating to a second station that is moving relative to the first station, the first station can transmit gradient gathering probe signals addressed to the second station at an increased rate selected to provide enhanced resolution of the position information. These gradient gathering probe signals can be transmitted directly to the second station, or via one or more intermediate stations.

For example, the fast (gradient gathering) probing in an ODMA network can take place several thousand times per second. In such circumstances, even if two vehicles were traveling towards one another at 180 km/h, in other words a cumulative speed of 360 km/h (or 360,000 m/h, or 100 m/s), if probing is taking place at 1,000 times per second, the vehicles will have moved only 10 cm relative to each other between probes. In general, the increased rate of transmission of the gradient gathering probe signals is at least two times greater, and preferably at least an order of magnitude greater, than a standard rate of transmission thereof. As a result, even when stations are moving at relatively high speeds relative to one another, the stations appear relatively "static" to one another when their positions are measured with enhanced accuracy.

The gradient gathering probe signals need only be transmitted at an increased rate while the first station requires the enhanced position information. Otherwise, the increased probing rate would consume network resources unnecessarily.

FIGS. 6(a) to (f) relate to a more detailed description of the process of the second embodiment of the present invention. FIG. 6 is a series of connectivity diagrams showing five stations in an ODMA network, labeled A-E. As in the previous example, it should be appreciated that the stations forming the network may be devices of varying type. In this illustrated example, there are telephone handsets (telephony), computers or PDAs (data provision, via the Internet, for example) and a seed station. In the sequence illustrated, each of the stations has generated up to four close neighbors, labeled 1-4 for each station. Some of the neighbors are shared as close neighbors between the stations (D3/E2 and C1/E1). In FIG. 4(a) all the stations lack position information (represented by circles), with the exception of the seed station E which has absolute position (represented by a diamond). In addition there are two close neighbor stations that have absolute position information from the outset, namely C1/E1 and D2 (both being represented by diamonds). Neither stations A nor B have any information from immediate close neighbors regarding position.

(Under standard ODMA processes, however, B would have information about E from the probes sent by C. In this second embodiment the additional information received through neighbors is of lesser relevance to the fixing of position.)

It will be immediately apparent that from the start stations C and D will be able to establish that they are within certain radii of the seed station E, using the technique illustrated schematically in FIG. 1(a). In addition stations C and D will be able to establish that they are both at either one of two particular points, as they each have absolute position information available from two close neighbors (refer to FIG. 1(b)). Either of these two mechanisms for determining position may already provide sufficient accuracy for the purposes of stations C and D. Furthermore, surrounding neighbor stations may be able to assist in removing any ambiguity in position, as discussed below.

Figure 6A:
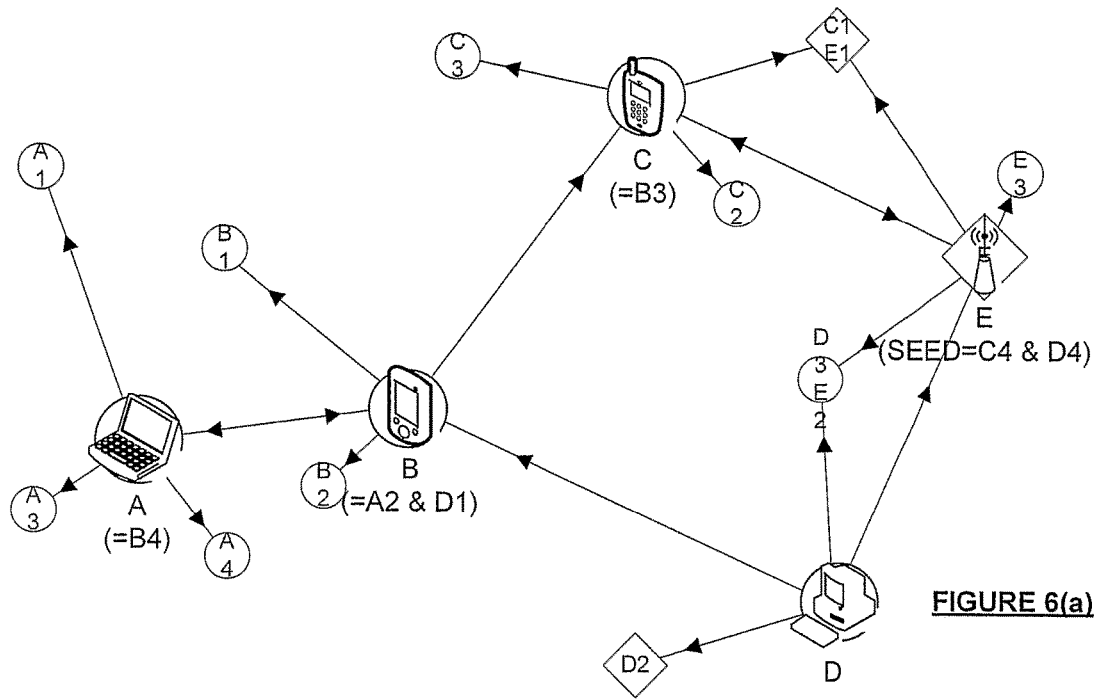
FIGS. 6(a) to (f) are a sequence of simplified connectivity diagrams showing the mechanism used by stations in an ODMA network when triangulating position in accordance with the second embodiment of the invention.
Figure 6B:
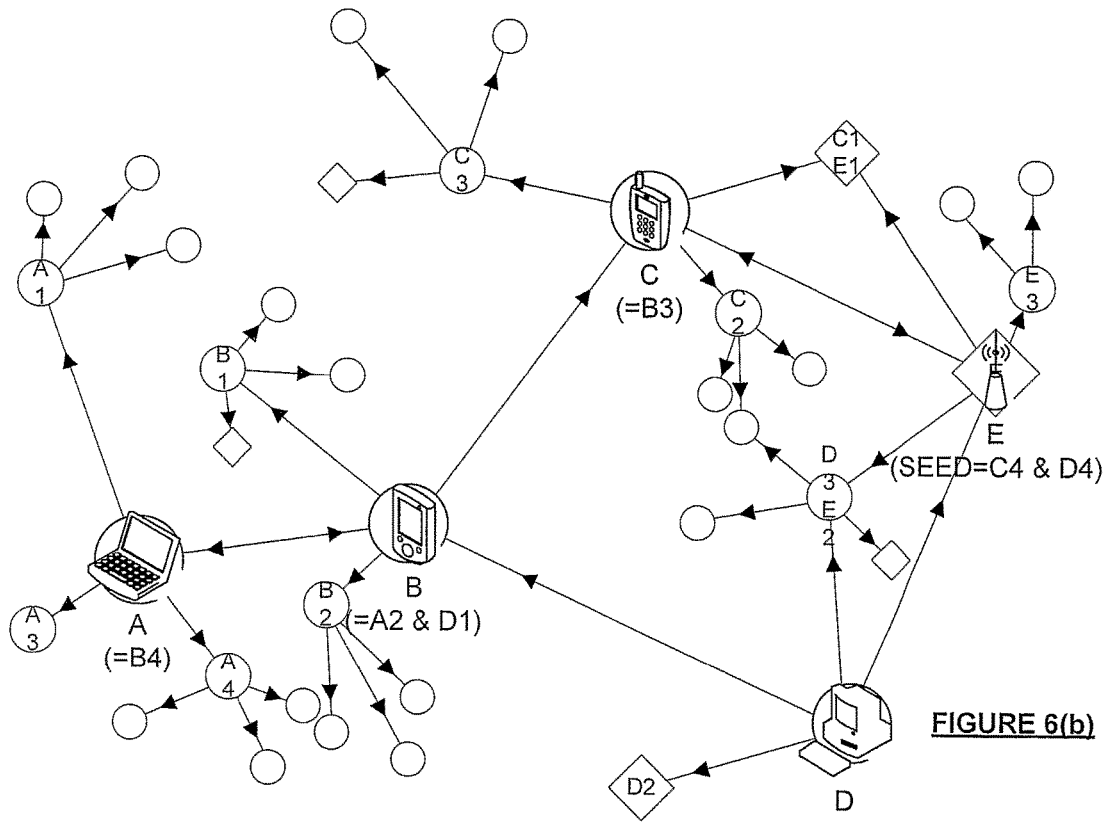

FIG. 6(b) shows that the close neighbors of stations A to E in actuality each have several close neighbors of their own, some of which may already have absolute position information (represented by diamonds). This determination of neighbors and position information for these neighbor stations will have been acquired or determined independently from other stations in the greater network by similar processes as described here. These processes will be taking place simultaneously across the network, outwardly from and inwardly towards the stations illustrated, but for simplicity only the mechanisms operating in respect of the identified stations are described.

Figure 6C:
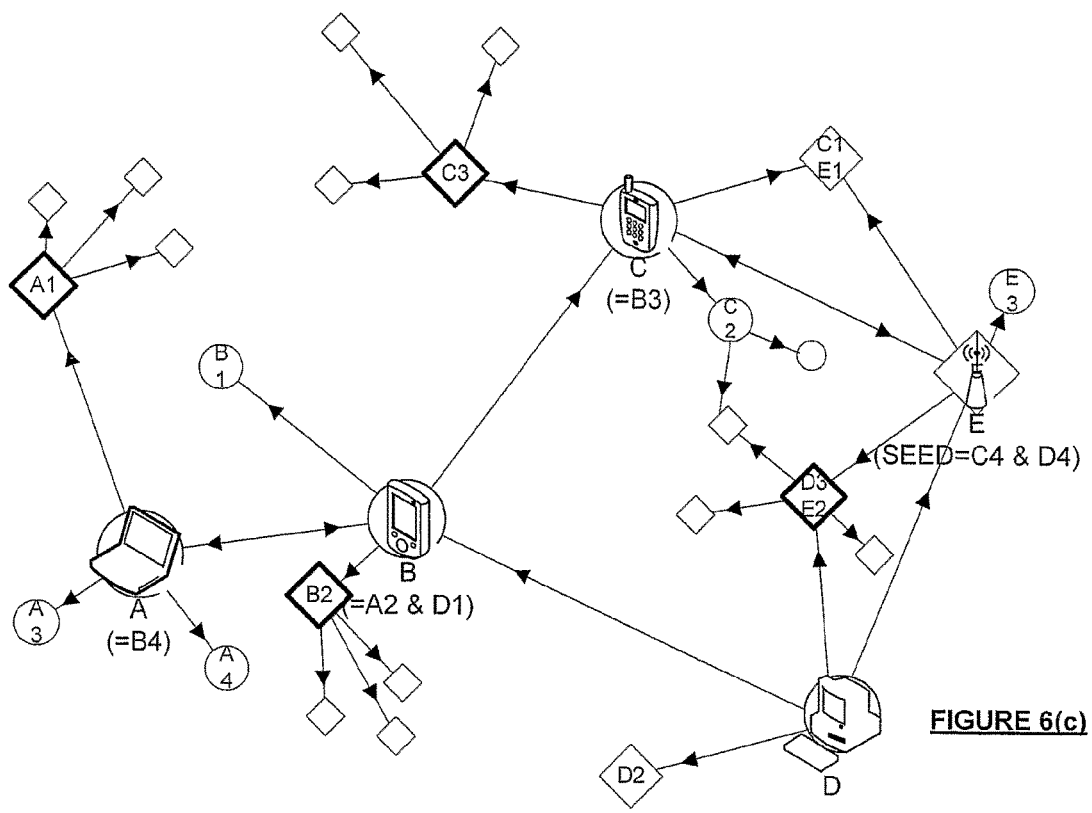

For purposes of explanation of the positioning process, the stations have not been shown to be moving, although as indicated above they will be capable of doing so in the ODMA network. Similarly, as in the first embodiment, the neighbors being maintained adaptively remain static for illustrative purposes only, although the close neighbors could be changing due to variations in the connectivity available. FIG. 6(c) shows the connectivity diagram after initial probing by the stations. It can be seen that close neighbors A1, C3, B2 and D3/E2 now have at least three of their own close neighbors that have fixed their absolute positions (the fixed positions of these neighbor stations being established by means independent of the example provided in respect of stations A-E). This has enabled these stations to triangulate their positions from these neighboring stations. Consequently, stations C and D now have at least three neighbors with absolute position information within one hop from which they can triangulate.

Figure 6D:
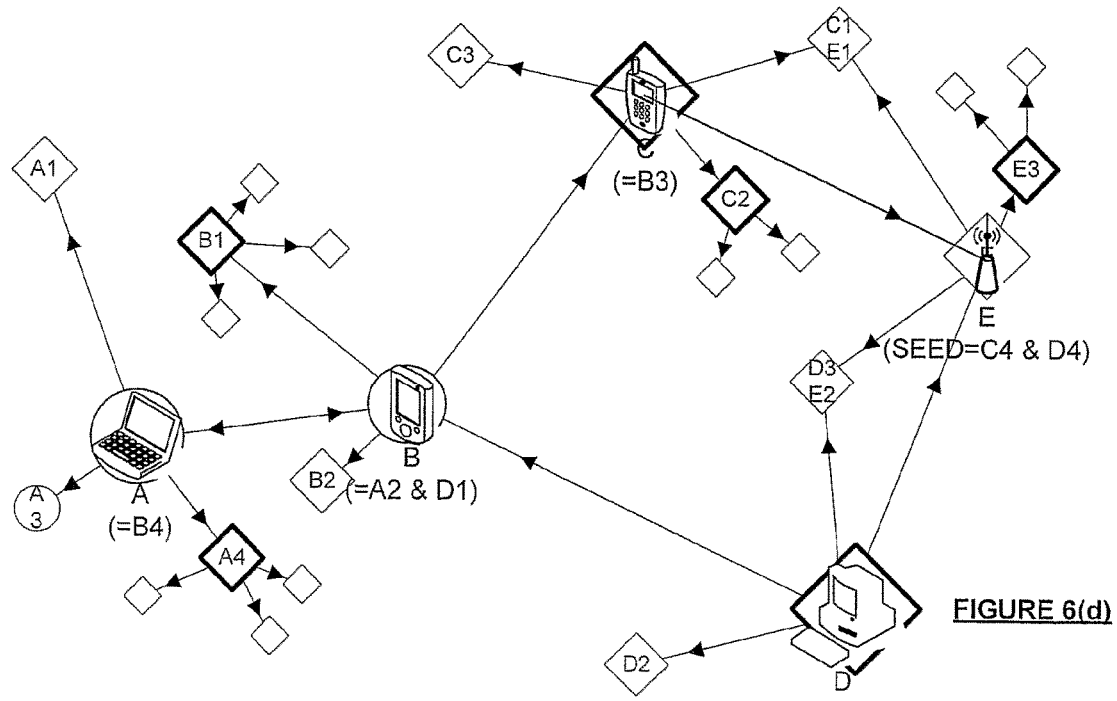

At a later time, as shown in FIG. 6(d), stations E3, C2, B1 and A4 have also successfully obtained absolute position information through triangulation, thereby providing station D with 3 close neighbors and station C with four close neighbors from which to determine position. As the four stations around station C have not gathered their position information from the same neighbors, station C will have additional information that will allow triangulation from different stations and thereby facilitate testing of the accuracy of the position established. From this information, other stations, even position-enabled stations, such as the seed station E, will themselves be able to test and refine their own positions using position information obtained from the other stations, enabling the overall level of positioning information in the network to improve in accuracy through the different information opportunities made available.

Although it might appear redundant for position-enabled stations to participate in such a process of refining their position information, it will be understood that GPS and other positioning systems are only accurate to a certain degree (say, to within 10 to 15 meters) unless enhanced with additional data or equipment. As the other stations are able to consolidate and refine their positions from alternate sources of position information, it may become apparent that the position of a seed station is not actually all that accurate. If there are many other stations near the seed station, the accuracy attainable could theoretically be of the order of centimeters as even radio propagation will provide very accurate distance measurements over short transmission hops of high quality. It is also possible that a seed station may have been set up inaccurately (for example, the seed station may have been inadvertently moved after being programmed with GPS-derived position information, or it could be faulty). The more stations made available, the more accurate all the positioning will be in the network as a whole, especially in respect of each station relative to the others. If certain stations have a higher quality of position information, the station will be preferred to others in the testing process. In this way, any anomalies should be easily highlighted and can be corrected.

Figure 6E:
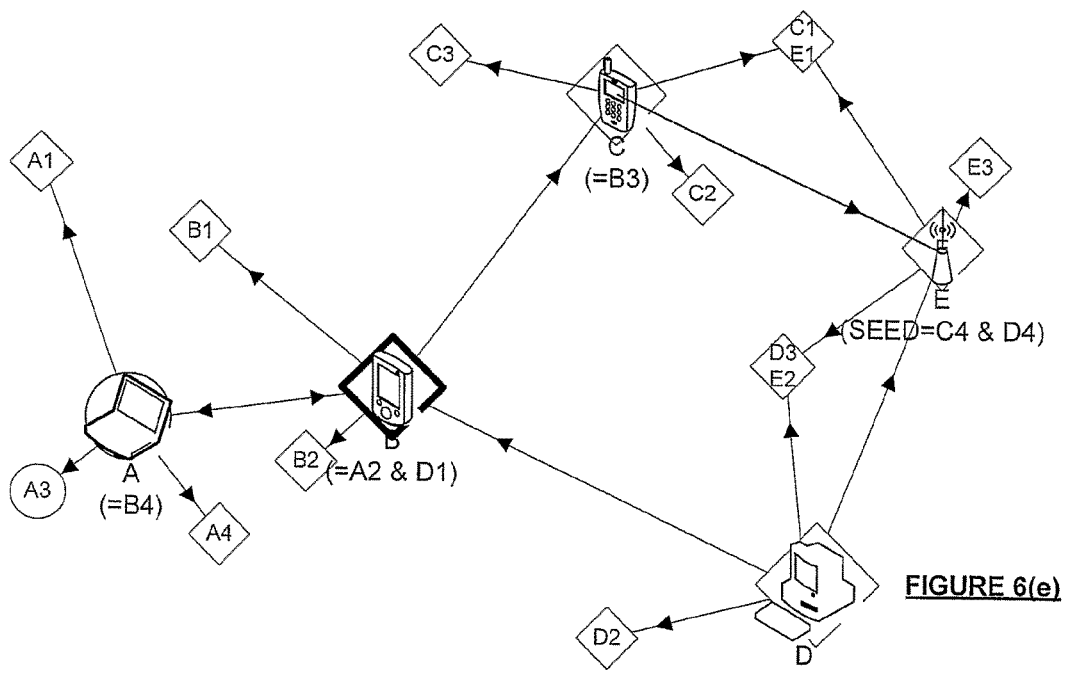
Figure 6F:
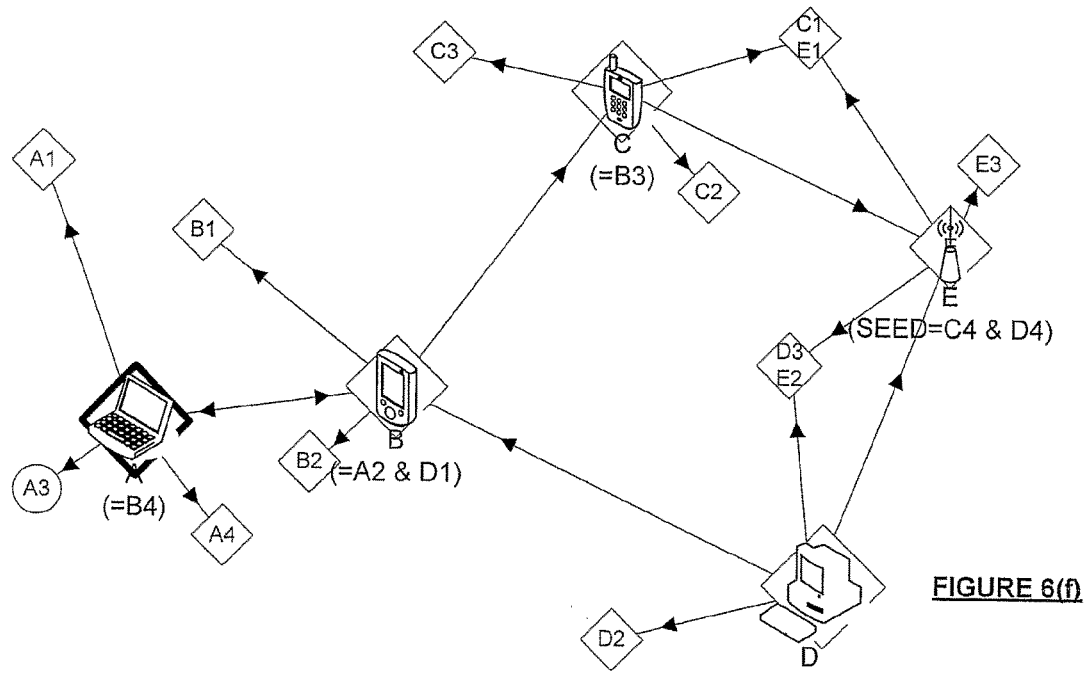

By the time shown in FIG. 6(e), station B now has sufficient information with which to triangulate and by the time reflected in FIG. 6(f), station A is able to determine its absolute position.

It is important to reiterate that regardless of the embodiment used, prior to each station receiving information regarding position (relative or absolute), the station may have location information that is sufficiently accurate for the purpose required. The main feature to recognize is that the positioning becomes increasingly accurate as more information is made available through neighbor gathering. Consequently, the connectivity and positioning information expands and grows very quickly to cover the entire network. Even though, station A in FIG. 6 for example may have been located in a seemingly inaccessible location, such as an underground basement, with neighbor gathering through slow probing, the location of station A may still be determined. As previously indicated, even though station A may not have initially known its absolute position it may still have sufficient information to establish its relative position to station B and the other stations.

This is a significant advantage of the process, enabling stations which would otherwise have no means of establishing position, such as stations located indoors or underground, to be located through the neighbor gathering process. Through the probing process and the multiple hops available to stations with the information required, there are effectively many stations that can find hard to reach stations. The more stations provided, the more difficult it will be for a station to remain undetected. Another advantage is that, as some stations have accurate information being provided on an ongoing basis, any stations that have poor information with which to calculate position initially will be able to analyze information received and refine the earlier iterations in the calculation of position. This activity is similar to the ODMA opportunity driven routing mechanism for communications, in that the more neighbors available, the greater the number of optimal opportunities available as choices for a station to locate high quality information on position and relative movement from its neighbors.

The ODMA communication network is able to establish station positioning information in real-time, and the more stations in the network the greater the accuracy will be. While the movement of many of the stations may complicate the process on the one hand, as positions are constantly changing, the relative movement does provide additional information which, perhaps a little counter-intuitively, further enhances accuracy and the amount of information available.

As previously indicated, some stations will be able to relay the fact that they are not moving, and may even provide a predetermined grading of the quality of the positions determined. The longer the station remains immobile the more accurate the position will likely become. Being cognizant of the reliability of certain information, stations that are mobile will utilize these stations with enhanced accuracy preferentially in comparison with their other neighbors. However, stations will also be able to detect relative movement of their own position or that of other stations. As a station moves, a stations will recognize that the distance is changing and in combination with other stations will be able to calculate speed and direction by geometric techniques.

However, there are also dynamic signal characteristic effects generated that may be monitored and these characteristics provide information when analyzed, namely changing signal strength, phase shift, Doppler shift and multi-path distortion. Should two or more stations receive information through probing in relation to the same moving station, then collaboratively these radio characteristics will provide information in respect of the direction traveled and the speed of travel. For example, if all neighbors detect the Doppler shift, motion will be detected and between them, the stations will have sufficient information to make sense of the movement in terms of direction and speed in real time.

When analyzing signal characteristics, there are a number of issues that impact on the transmission quality of signals between stations and this information can be analyzed to provide positioning and relative movement of stations. As radio frequency signals take different paths from a source to a destination station, part of the signal may travel to the destination station directly, while another part may be reflected or deflected off or through obstructions prior to reaching the destination. As a result of the reflection or deflection, part of the signal will experience a time delay as it takes a longer path and will lose more energy than the part of the signal following a direct route. Multi-path distortion is a form of interference that occurs as a consequence of the different paths taken by the direct and deflected signals, as they subsequently combine, causing distortion to the desired waveform.

As a general rule, the signal strength will be affected primarily as a result of the distance traveled (usually due to free space loss as the signal power is spread out over the surface area of an increasing sphere). However, signal strength will also diminish through losses encountered by passing through certain media and also by virtue of the multi-path propagation problems (multiple copies of a signal may arrive out of phase, adding destructively and lowering the signal level relative to noise). Consequently, if the path is line of sight then signal loss may not be severe, but in urban surroundings the path of the signal is likely to reach the destination station after reflection, diffraction, refraction and scattering of the signal. A fast relative movement between stations will result in the receiving stations experiencing rapid fluctuations of the signal strength (in amplitude and phase).

While analysis of the signal characteristics can lead to better assumptions, it is still possible to interpret the information incorrectly. For example, the strongest signal will generally be interpreted to be the direct signal, with the weaker signals interpreted as deflected signals. However, if the main signal traveled through a highly attenuated path (through walls or thick vegetation) it may be that the deflected signals are stronger and it will be difficult to differentiate the direct signal from the multi-path signals—and this will mean more errors in any distance calculations. With more stations available for assessment calculations these peculiarities can be recognized very quickly as the stations are obtaining their own information from different positions relative to the station and its neighbors.

In addition, because some of the stations move, the inconsistencies will be picked up more easily by virtue of the new calculations processed. As direct and deflected signals are better differentiated, stations will be able to determine whether they themselves have been moved, or whether one or more of their neighbors have moved, as well as the direction and speed of the movement. The information could be utilized as a factor in determining whether to prefer information received from one station over that received form another.

In a cluttered environment there is less likelihood that the source and destination stations will be in direct line of sight—but there is a strong chance that many of the relaying stations are indeed in line of sight from each other. This means high quality information is being passed on along the route.

It will be appreciated that if any stations use a directional antenna in the network then only two other neighbor positions would be required to fix geographical position, and if there is additional information from another party the station can quickly determine whether there are reflected or refracted signals or multi-path distortions as well. In addition, the mobility of the stations increases the chance of these discrepancies being noticed and corrected, enabling more advanced techniques to be used that can demodulate or separate the waveforms using encoding in the waveforms et cetera.

Figure 7:
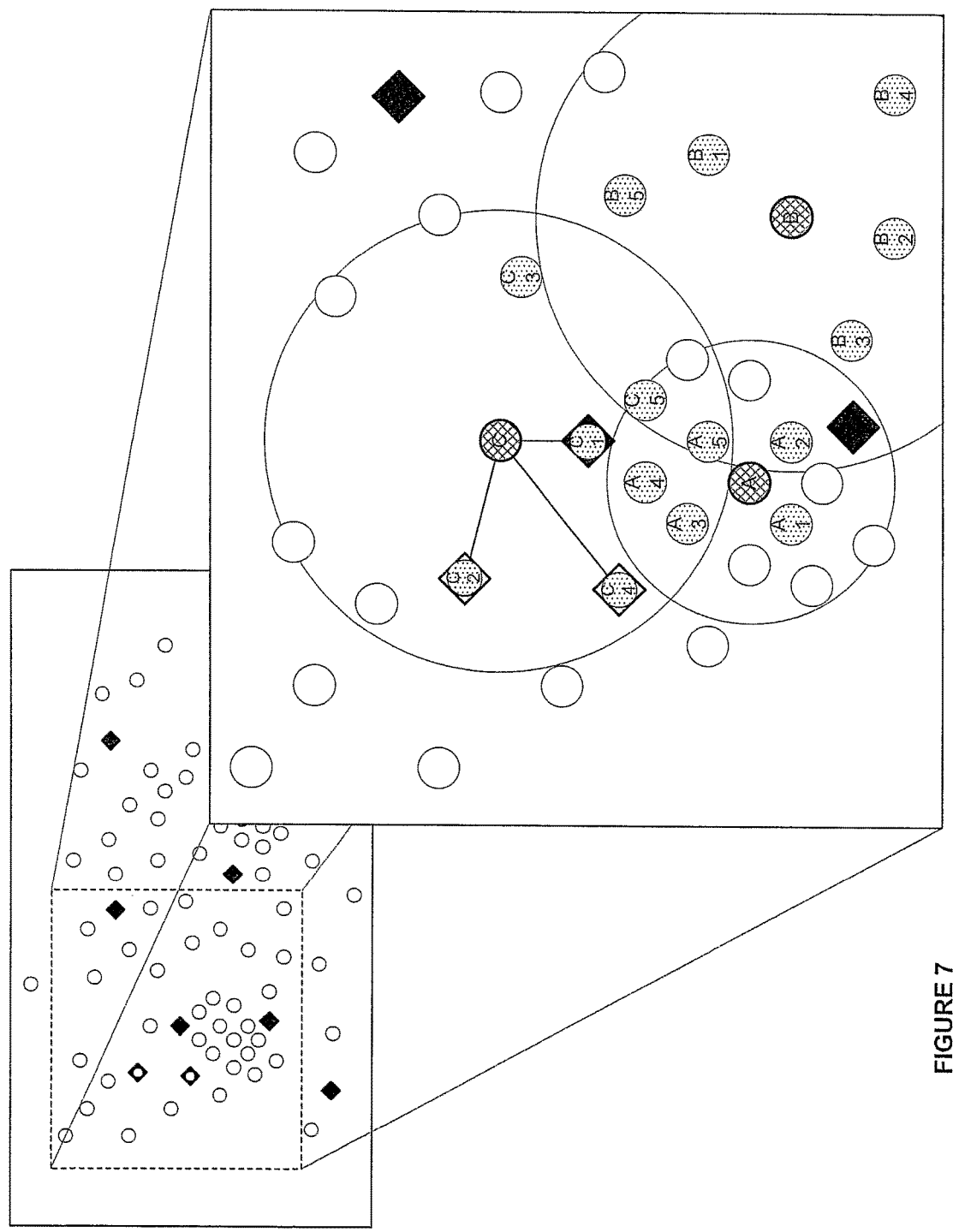
FIG. 7 is a simplified schematic diagram showing a subset of the stations of FIG. 2, showing certain of the stations having gathered neighbors through probing.

FIG. 7 is illustrative of some of the processes taking place around a subset of the stations shown in FIG. 2. In FIG. 7, three stations A, B and C are shown, each of which has developed ten neighbors by probing. The extent of propagation transmission strength of probe signals required from each station is shown, such that each station has gathered ten stations as neighbors, of which five are "close neighbors" and labeled 1 to 5. Station A requires the least power to gather the minimum numbers of neighbors as they are in a closely populated area. Station B requires the greatest power.

Of the stations shown, it can be seen that only station C has three neighbors having known position within its group of detected neighbors, so station C can establish its position by triangulation immediately using the mechanisms of the second embodiment of the invention described above. It can also be seen that certain neighbors of the stations are shared with other stations. For example, neighbors C5 and A2 are amongst station B's detected neighbor stations.

Figure 8A:
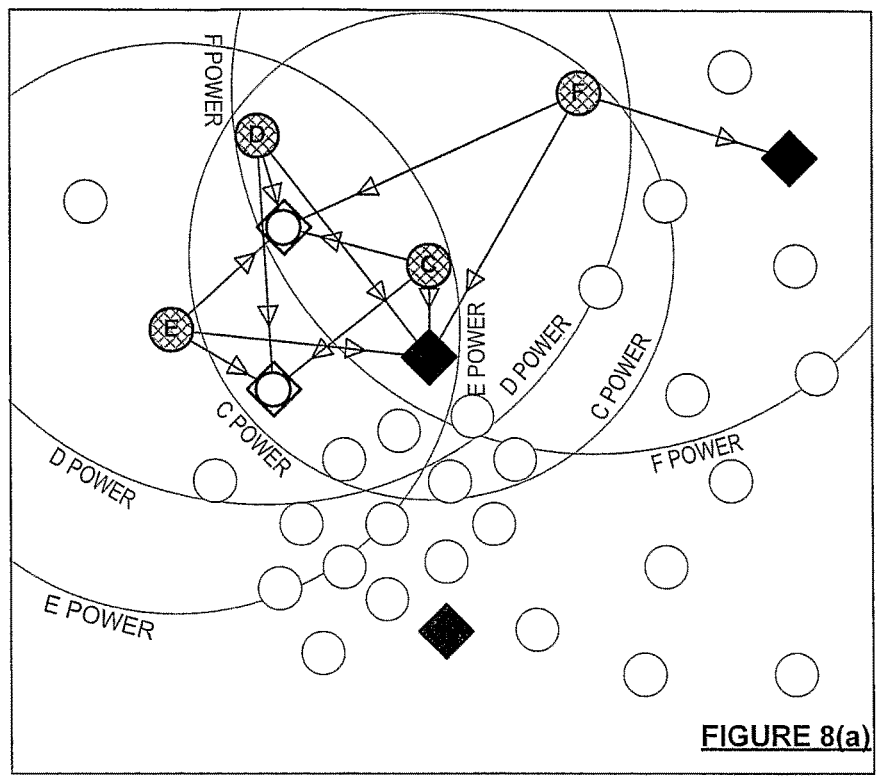
FIGS. 8(a) and (b) are simplified schematic diagrams showing the position determining mechanisms of stations having sufficient fixed absolute position neighbor stations from which to triangulate their own absolute positions in accordance with the second embodiment of the invention.

FIG. 8(a) shows the stations of FIG. 7 that have three stations of known position within their ten detecting neighbors and within the maximum power levels needed to gather ten neighbors with established fixed positions. Stations D, E, and F are accordingly able to triangulate and establish their own positions.

Figure 8B:
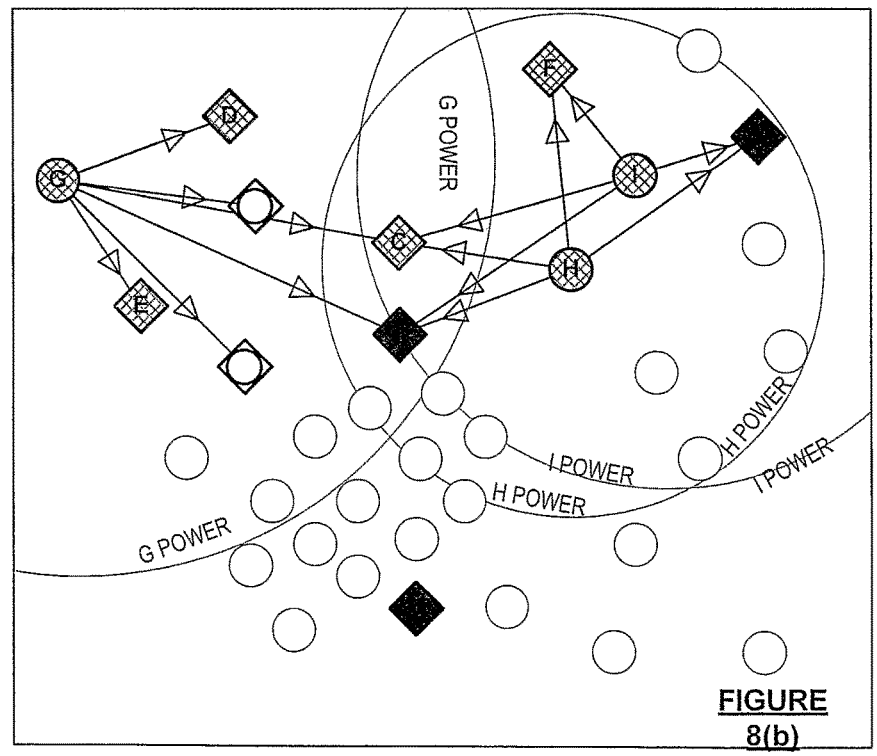

FIG. 8(b) shows the stations of FIG. 8a) a moment later, after stations E, H, and I have been able to triangulate their positions following the position fixing of stations C, D, E, and F. It will be appreciated that all these stations now have more than three stations with absolute position from which to triangulate, enabling testing and refinement of the positions already determined.

Figure 9A:
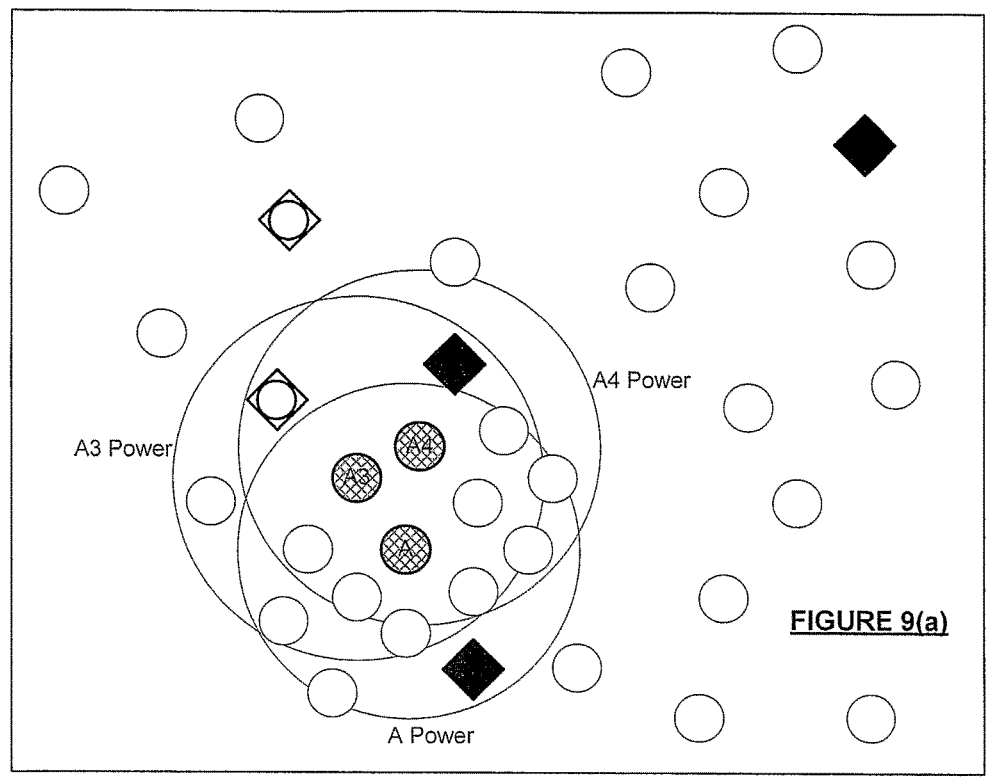
FIGS. 9(a) to (d) are simplified schematic diagrams showing the position determining mechanisms used by stations of FIG. 7 not having sufficient neighbor stations from which to triangulate position.
Figure 9B:
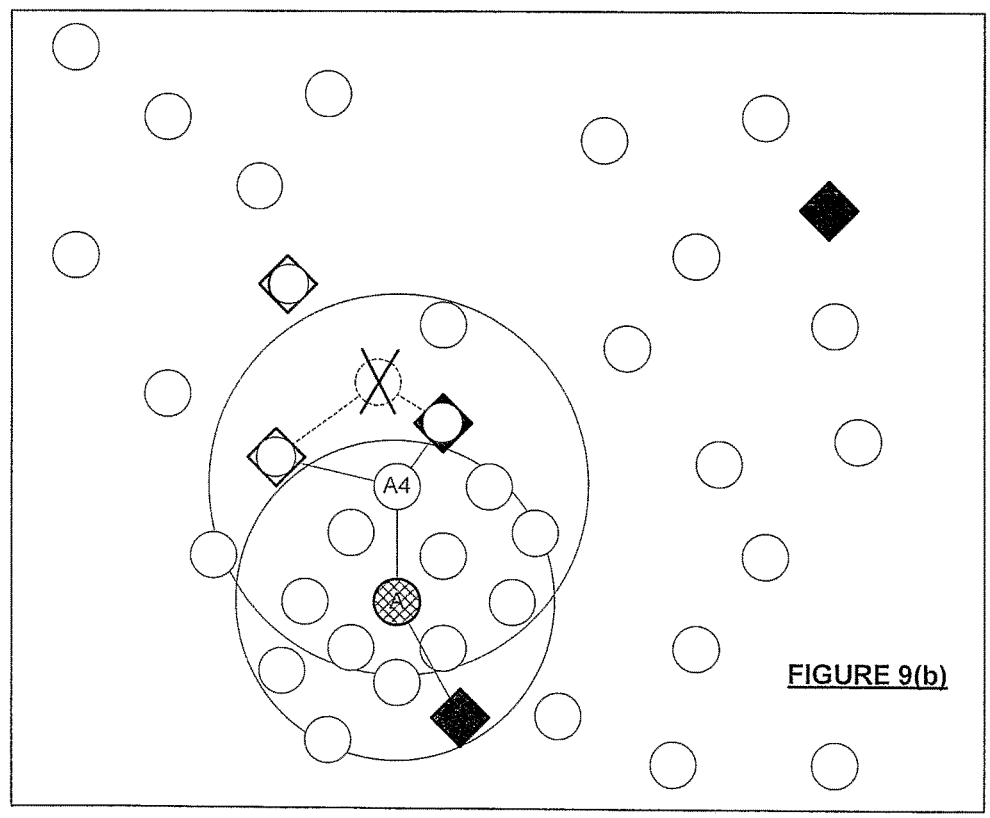

FIGS. 8(a) and 8(b) show the mechanism where some of the stations are spaced relatively far apart from one another. FIG. 9 illustrates some of the mechanisms that may take place when stations are in more densely populated areas. In FIG. 9(a) for example, the transmission power bounds of station A (of FIG. 7) and two of its close neighbors (A3 and A4) are shown. It can be seen that because the stations are close together, each of the stations is able to obtain the minimum number of neighbors at relatively low power settings. However, this means that all of the stations with fixed absolute position information are not maintained as neighbors, leaving stations A, A3 and A4 only able to determine relative position information.

Figure 9C:
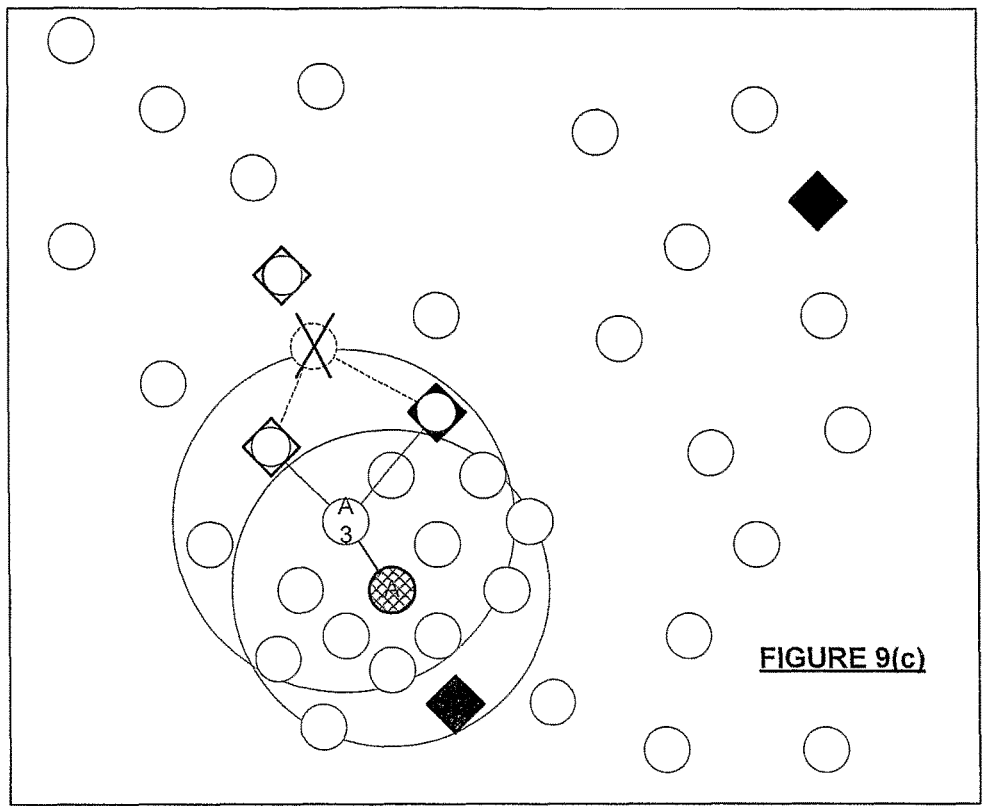

However, the slow probe process provides essential information about the neighbors of a station's neighbors. For example, in FIG. 9(b), station A will maintain station A4 as a neighbor and in so doing will be listening to the probes received by station A4. Station A will consequently know that station A4 has two neighbors that have absolute fixed positions. Station A4 itself will be attempting to determine its position and will be able to establish that it is at one of two positions (refer to FIG. 1(b)). Station A4 will know the distance to each of its neighbors and many of the neighbors of these neighbors will know the distance to station A4. Between them, as some stations will not be able to hear station A4 despite it potentially being close, the stations will quickly be able to resolve the ambiguity and determine the true position of station A4 from the two available alternatives. Once a fixed position for station A4 is established, station A will have two stations from which to establish its position using the methods described in the second embodiment. The other station A neighbors may be able to assist in resolving any ambiguity in station A's true position from the two available possible positions, or station A3's position could soon be determined, as represented in FIG. 9(c).

Figure 9D:
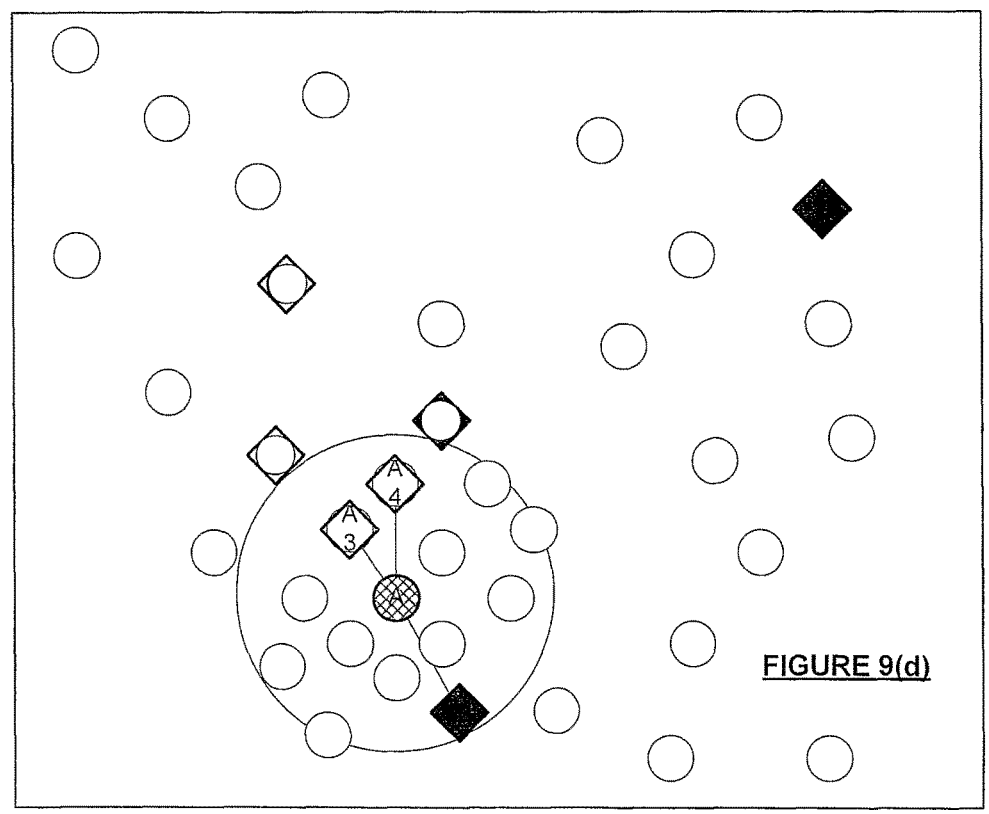

Once the absolute position of station A3 is fixed, station A can triangulate its own position as shown in FIG. 9(d). It should be appreciated that all of the stations surrounding station A will have been able to each determine their relative positions in relation to their neighbors. Consequently, as soon as the position of one of the stations becomes fixed absolutely, all the others will be able to determine their own absolute positions almost immediately. It should also be apparent that even without the knowledge of station A3's position, station A could have resolved the ambiguity surrounding its position. The fixing of station A3's position enables station A to verify the position previously established and improve the accuracy. This scavenging of information to resolve ambiguity and improve accuracy is a key benefit of the ODMA positioning process through probing, enabling conclusions to be made through the stations each mutually assisting each other.

If there were only a few neighbors in a sparsely populated network, errors in any absolute position provided would be passed on from station to station. However, the relative positions of the stations to each other would be very accurate, as the determination of distance can be very accurate depending on factors such as the distances involved, the mechanisms used and the quality of the connectivity between stations. As more stations become available on the network, that have established their own location accurately, the better the quality of information that is accessible for analysis and the more accurately the station's own position can be determined.

For example, in the event that the triangulated positions that are calculated at a station conflict (using information from different sets of stations), with further analysis it may be possible to determine where the inaccuracy arises. If there is convergence on the position from several sites on a simultaneous basis then there is a strong inference that one position determination is reliable, and in this manner the network positions can be corrected on an ongoing basis and becoming increasingly accurate. Moreover, the stations will be able to assist each other in resolving ambiguities as will be made evident below.

This process is further illustrated in FIG. 10 using mechanisms described in the first embodiment of the invention. In FIG. 10(a) for example, as in FIG. 4 above, station A readily establishes distances to its neighbors (three of which are illustrated (A1, A2 and A3)). A1 has neighbors A11, A12 and A13, as shown in FIG. 10(b). As A1 shares A2 (also A11) as a neighbor, the relative positions of A, A1 and A2 are quickly determined. Similarly, A13 has A2 (also A131) as a neighbor, so the relative position of A13 can be established. However, because a station receives all the information of the neighbors of its own neighbors, this can be shared two hops ahead. So in the illustrated instance, A1 and A2 will know the distances from themselves to A and from themselves to A13. A will consequently know its neighbors' neighbors, and consequently knows the distances between A1 and A13 and between A2 and A13. From this, A will know exactly where A13 is relative to A (and vice versa) despite the fact that the stations are two hops away and not in communication with each other. Indeed the neighbor tables held by the stations could maintain information of another level of neighbors (the neighbors of A13 through A1 and A2, for example), that would enable position to be determined over three hops. If this were the case, A would realize that A133 is a station with absolute position information, as well as C1 and C4.

Figure 10A:
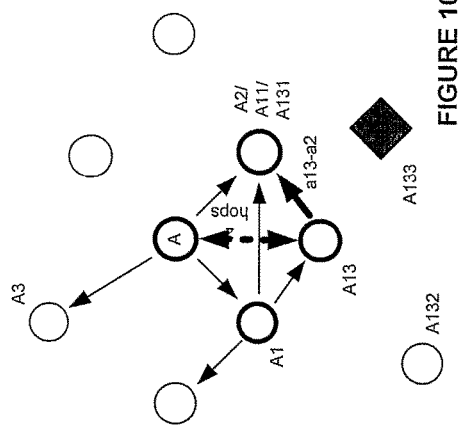
FIG. 10 is a simplified schematic diagram showing an alternative technique employed by the stations of FIG. 9, in accordance with the second embodiment of the invention.
Figure 10B:
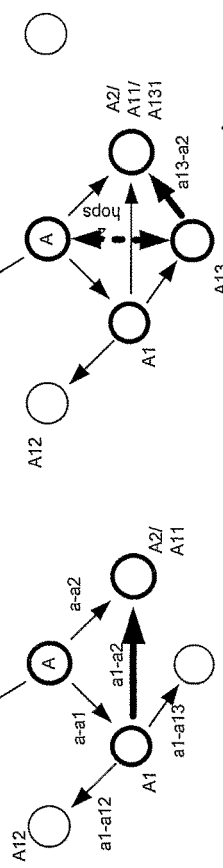
Figure 10C:
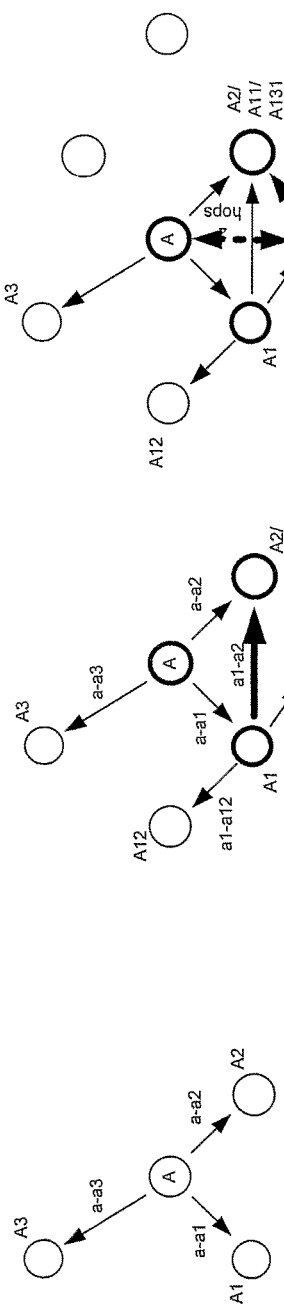
Figure 10D:
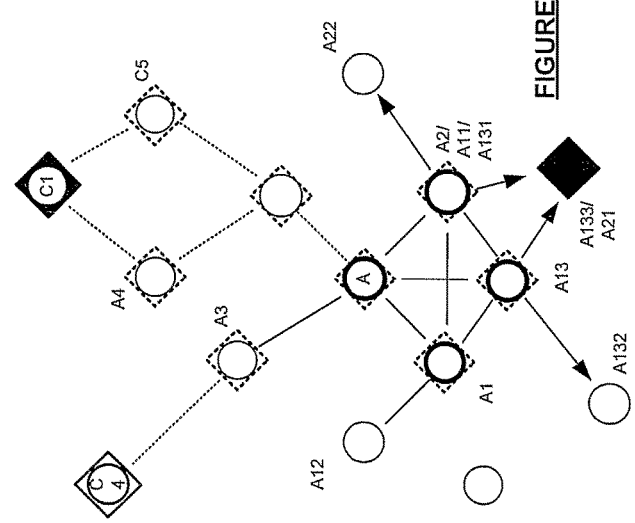
Figure 10E:
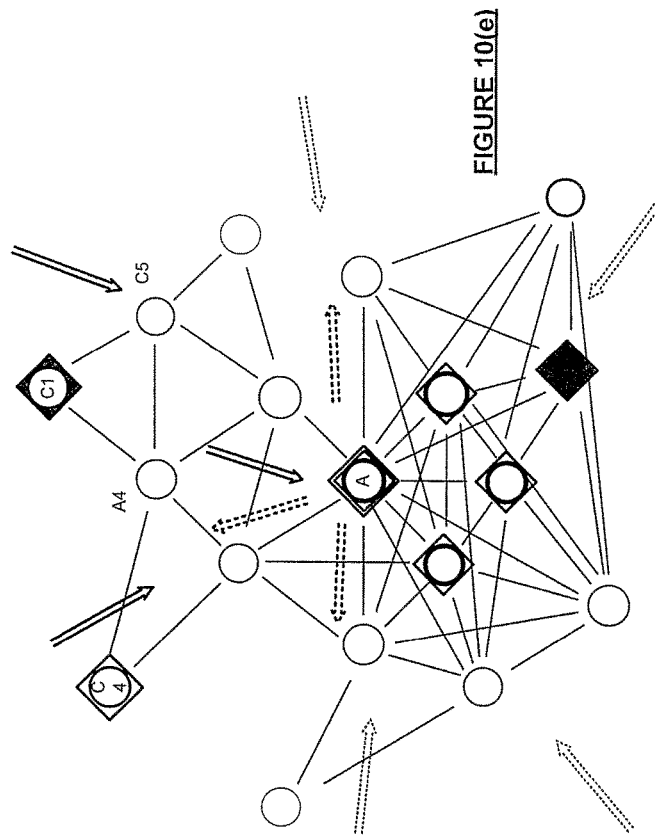

In any event, as the stations determine their relative positions, by FIG. 10(d) a station with absolute position information is a neighbor of A13 and A2. If other stations in the network, even if far apart, have absolute position, they can establish absolute position in subsequent communications from the stations with this information. It must again be borne in mind, however, that the mechanism described above is happening in all directions outwardly from each and every station, so station A will be receiving relative information (to two hops) initially from several sources, and then absolute information from several sources (FIG. 10(e)). So A and the other stations will ultimately be in a position to fix their absolute positions, then verify or refine these continuously. The crystallization effect will be relatively rapid, then very rapid when absolute positions are available, and then consistently readjusted.

Figure 11:
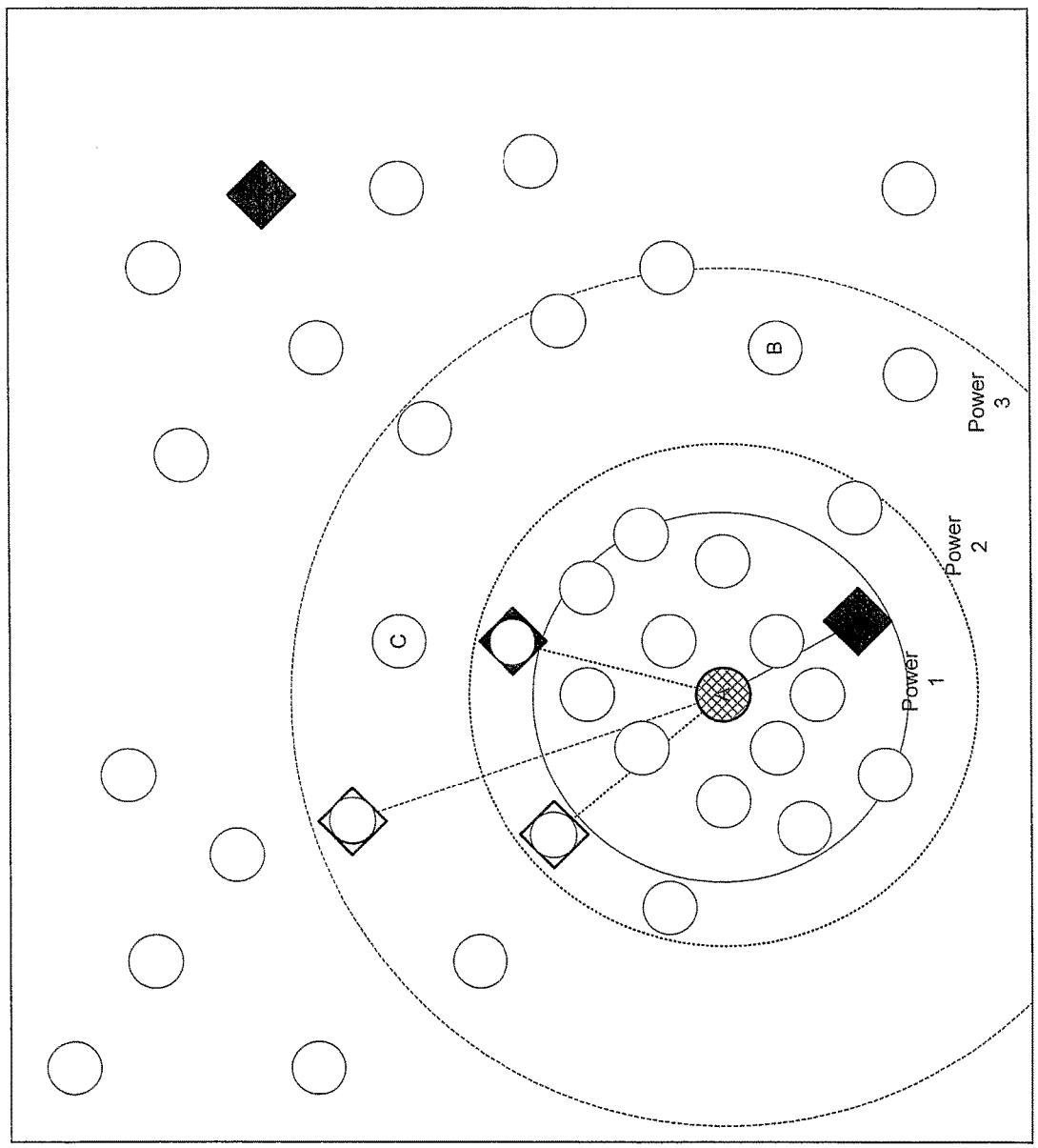
FIG. 11 is a simplified schematic diagram showing an alternative technique employed by the stations of FIGS. 8 to 11.

FIG. 11 shows an alternative means for station A to gather the minimum number of fixed stations—it can simply increase the propagation strength of its probe signals until it reaches sufficient stations. However, it is preferable that the ODMA network as a whole operates at lower power levels as this increases the overall efficiency, by minimizing interference and collisions of transmissions, for example. Thus, although this method certainly may provide the required information quickly, the accuracy will be reduced by virtue of the greater distances involved and the chaotic signaling that will be created. Of course this process will be refined as more positions in the network are established.

However, before this alternative process is initiated, it is much more preferable that stations slowly generate neighbors and remain patient. If necessary, messages could be transmitted through the network to indicate that good connectivity is available, as this will communicate to each station that the station is not completely isolated and will be located in due course. Alternatively, the isolated station could send discrete enquiries to its neighbors, or to certain designated stations, or with an instruction to locate certain categories of station and redirect the message to the station so that it can reply with information relating to the progress that may be made in locating the isolated station. This will help to mitigate the need for increasing transmission power levels and should reduce the chaotic consequences of doing so.

Provided there is connectively from source to destination, then gradually all network station positions will be determined, even if there is only one datum point. In a communications network, messaging connectivity could be established through the processes described in WO 2005/062528 entitled Probing Method for a Multi-Station Network and PCT/IB2006/001274 entitled Multi-Medium Wide Area Communication Network. If the other station can be communicated with in this manner, then it is clear that there is connectivity to that station and the positioning process can be undertaken. If necessary, the position of either the first, requesting station or the position sending station can be set as a datum point (for example, in an x, y, z dimensional space the datum point could be set as (0,0,0)).

If a first station wants to know the position of another station in the network, it could send out a position request message as a regular communication message, which in turn could initiate a positioning process if appropriate. The position request message could be addressed to a central authority maintaining position data and/or position determining data of stations in the network, or could be sent to any other appropriate station that may have this information, or access to the information, including neighbors of the first, requesting station for onward transmission to the other station. Alternatively the first, requesting station could address the position request message directly to the other station, and the latter station could transmit a message back to the first station via the network with the required position information, or initiate a position gradient back to the requesting station.

If the requesting station provides the datum (broadcasting to everyone where it is), then other neighboring stations will determine their positions relative to the requesting station, with the certainty of position information expanding like a crystalline structure, until the desired station is located. Relative position or absolute position, as the case may be, could then be communicated as available, but in either event, there will be a relative vector available in respect of the stations.

Alternatively, the sending station can generate the crystallization process from itself as the datum point. This would grow outwardly until an absolute datum is reached and communicated back to the station.

Indeed, any station could initiate a fast probing mechanism to determine position even in circumstances where the other stations are not maintaining position continuously. In such circumstances, the station attempting to determine its position will transmit probes with certain instructions, for example asking other stations to initiate probing themselves. The extent of the probing could be specified to apply to stations receiving the probe within a predefined number of transmission hops from the station wanting to determine its position; and the extent of the probing from the recipient stations could also be limited to a certain number of hops form each of these stations. From this information stations would quickly establish at least relative positions with respect to one another, and if the requisite number of stations with absolute position information were located within the specified number of hops, the "crystal" expanding from the original station will be fixed absolutely; enabling all stations involved to establish position. If absolute position stations are not found, or if a desired destination is not located within the crystal generated, the initiating probes could now specify an increased number of predefined hops to be probed in order to expand the crystal growth in an attempt to locate the desired stations (either specific destinations or stations with position information). In this manner, position determination might only be activated "on demand" by stations in the network when required or for so long as needed, and in the process the stations involved would assess their own position which could be recorded. If a desired destination station is located, the gradient between the originating and located stations could be maintained for as long as is desirable for the purpose, and then stopped to minimize usage of network resources. Of course, in a network not requiring ongoing position information, the network itself (or portions thereof) could be asked to undertake this process intermittently from one or more stations to establish station positions and then to stop.

The slow probing process has the primary role of gathering neighbors of high quality. In this mechanism, the positioning crystallization process is first generated and then requests are made for position information. However, it is possible to utilize the fast probing process to find other stations, developing the crystallization through the network between the stations until it finds the desired station. A "distance gradient" could then be built back to provide the relative vector between source and destination stations and maintained "on demand".

Figure 12A:
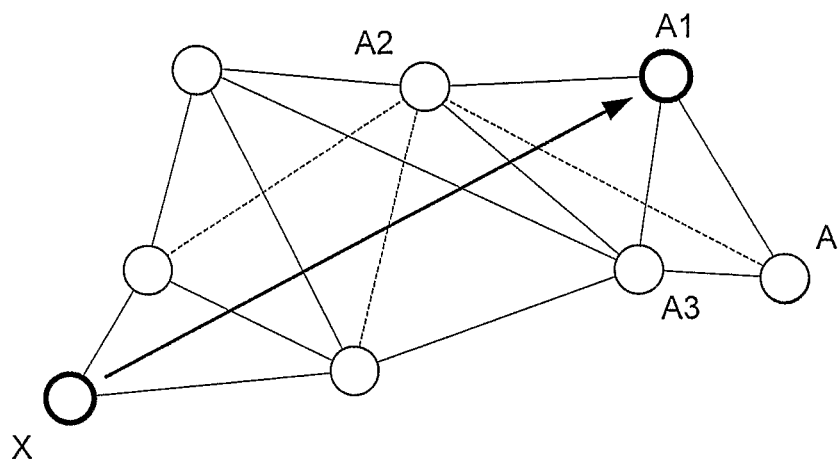
FIGS. 12(a) and (b) are simplified schematic diagrams similar to those of FIG. 5, showing methods of obtaining a distance gradient or position gradient.
Figure 12B:
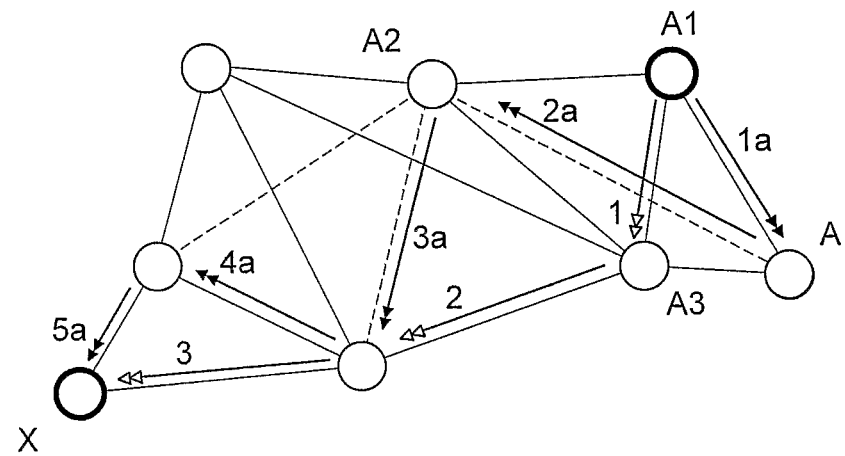
Figure 13:
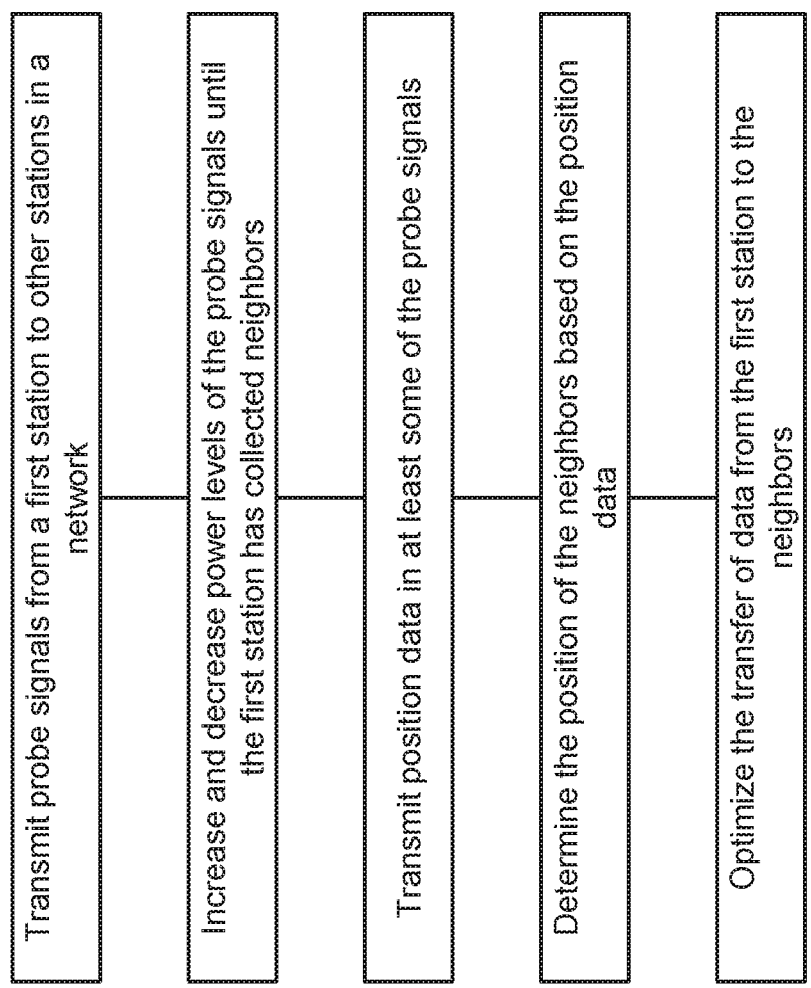
FIG. 13 is a block diagram showing a method of operating a network.

In FIG. 12(a), a station X is attempting to establish the whereabouts of a station A1. Although A1 is three or more hops away, X can send out a fast (or gradient gathering) probe signal looking for A1. Once located, A1 will respond and a gradient will be returned through the stations, each providing the distances and directions available between the intermediate stations, from which X can establish a relative or absolute vector to A1, as the case may be. FIG. 12(b) shows that the gradient could be defined through various combinations of intermediaries. It may be that a route through a greater number of high quality hops (e.g. shorter hops through a1-a5) is more accurate than a smaller number of hops (longer, or poorer quality hops 1-3); and the better choice from which to determine position might be assessed using cumulative errors.

The fast probing of this nature could be maintained simply to locate a station for a particular purpose and then the probing will stop, or it could be maintained for a specific period (tracking a car at speed, or movement between stations in an emergency situation, for example).

If the position of a station is determined, certain services or applications could be provided in the region or in a targeted fashion. For example, advertising, notices or information could be provided in the area of the station or in certain areas defined according to the location. So in such circumstances advertising banners could be utilized or users in the neighborhood (all users, or selected categories of users, or only certain selected users) could be provided with information or video streams to assist in finding a missing child; or stations and billboards that are in locations or en route to where an escaped criminal was or will likely be in the future could be fed information based on the movements of the criminal in order to obtain information, evidence or assistance. Specific police or other personnel at known locations can be given very specific information on a relative or absolute position basis.

An important feature that arises from the described ODMA positioning processes is a "neighborhood watch" mechanism that is enabled by virtue of the slow probing process. Each "neighborhood" or group of neighbors generated by the stations accumulates and retains a substantial collective and distributed knowledge. This knowledge can be accessed and assessed if necessary to establish positions, which is especially relevant in otherwise problematic circumstances.

Stations in the network of the invention maintain certain signal related information in the course of the standard communication process and algorithms and also additionally maintain a record of the last known position of neighboring stations. If a station is switched off or destroyed, or even if the battery merely fails, the other stations will have access to information in their memory in relation to the last known position and the time since the position was determined.

Even if a position had not been determined, the information on the signal strengths of the various neighbors can be reevaluated from the neighbor tables in order to determine the position and direction that had been traveled to enable certain conclusions to be drawn from the history retained. In addition the stations maintaining the information will also know the other stations that were detecting or close neighbors of the missing station. This suggests the stations that may be enquired from regarding position determination and provides the capability for certain assumptions to be made; for example two stations may have been recorded as traveling side by side for a relatively long period and it is consequently likely that the stations are still close together. Two people may have been traveling in a vehicle together when one station has run out of batteries. This is also similar to a parent asking people in the immediate vicinity if they have seen their lost child; or asking a known friend if the child is with them; or asking someone's last known traveling companion where they were last seen and in what direction they were traveling.

In an emergency situation the neighborhood will still have an up to date knowledge of the last known position and the closest geographically positioned neighbors. This will obviously provide emergency personnel with an accurate place to start looking for the station requiring assistance. Furthermore, as the knowledge is distributed to many other stations it is difficult to avoid the station user from being located. Even if a kidnapper, for example, switched off or destroyed a victim's station there will be many neighbors who can pinpoint the station's position immediately prior to this and it may thus even be possible to determine who approached the victim in the first place. This capability obviously has a myriad of applications, including the assessment of car accidents, hit and run incidents, et cetera. To further facilitate this process, updated position information could be sent periodically by stations to Authentication Servers that can be queried if necessary for nearest neighbors (and even for information regarding stations with absolute position).

Furthermore, a reduced capability to communicate could be obviated to some extent through the subsequent steps taken by the failing unit and by the immediate neighbors. For example, if a station's antenna is damaged or if the battery level is very low, the signal propagated by the station could be sent only to very closest neighbors on an occasional basis in order to remain in limited contact and reduce power consumption. If a station was hidden from the network, the dynamic nature of the mobile stations should increase the chance of a close neighbor being developed through the slow probing process or momentarily through the limited propagation basis in order to locate the station opportunistically, especially if other stations on the network were alerted to the fact that a station was missing and was in need of location in emergency circumstances.

In a standard wireless networking environment these benefits are not readily achievable, especially at the level of accuracy provided by the ODMA network system. A base station would simply have to retain too much information from so many stations to provide a workable solution without congestion and delay. In the ODMA environment the information is distributed only to immediate neighbors and is continuously updated. In the event that the information is needed, the stations can readily establish gradients to the necessary stations through fast probing techniques. This process is extremely quick, even in large networks.

Another application that arises by virtue of the "neighborhood watch" capability is that unusual or unwanted activities may be monitored by the network and if necessary other stations can be alerted. For example, if a station is moving at an unexpectedly high speed, or if a station is located in a certain prohibited area or in close proximity with another prohibited or undesirable specified station, certain appropriate responses can be made. These responses could include distributing knowledge quickly to neighbors or even specific emergency stations, or to a central authority.

This monitoring capability in real time will highlight unlikely, undesirable, or exceptional cases. The potential applications and responses are limitless and could include vehicle tracking, inventory management applications, monitoring of children, monitoring of people under probation or court injunction, or merely alerting network subscribers to the fact that they are near certain facilities such as fuel stations, police stations or restaurants, for example. Moreover in catastrophic situations, immediate responses could be taken automatically—an aircraft in distress might transmit at high power its position and also download details from its "black box" data recorder in case this is destroyed should it crash. The knowledge would be dumped to any randomly available stations in order to download all the information before the unit was destroyed. Mid-air collisions between aircraft could also be avoided by alerting each aircraft of the danger, et cetera.

In addition, it should be appreciated that in the context of many potential applications the level of complexity of the station units incorporated in the network may be very low. For example, in monitoring the relative movement between certain stations as described above, such as the distance between a mother and child, or the position of a police officer relative to his/her firearm and/or other officers, the functionality of these devices could be relatively unsophisticated. These units could possibly utilize the mainstream ODMA communication systems for positioning purposes, but not necessarily. If necessary, these simplified stations could merely probe and gather neighbors for their positioning information (whether through propagation characteristics or timing probes or by other means) and establish distances and other relevant data. Conventional ODMA stations could perhaps recognize the simplified stations as helpful neighbors for positioning applications, but could also disregard them as potential relay stations for message transmission in the operation of a standard ODMA communication network.

In principle, a network could be formed only for positioning and tracking purposes without the need for an ODMA communication network as such, although the basic ODMA neighbor gathering techniques as described would be carried out. In this manner, the exemplified vehicle tracking, inventory management or prisoner tracking solutions could either operate as stand alone networks, or could also be tied to other conventional network systems or other mobile network products, with or without using the ODMA communication network.

This form of positioning network would address many of the VOIP positioning problems experienced by non-ODMA communication network units. While it would be preferable to have the ODMA relay communication process to transmit the determined position data to some central control station, or to stations requesting the whereabouts of a particular station, in principle this could be reported through some other communication means.

The invention claimed is:

1. A method of operating a network comprising a plurality of stations each able to transmit and receive data so that the network can transmit data between stations via at least one selected intermediate station, the method comprising:
   determining locations of stations within the network, comprising:
      monitoring at each station, the activity of other stations on the network to establish an availability of neighbor stations having connectivity with the monitoring station;
      transmitting probe signals from each station to other stations which receive the probe signals from a probing station responding directly or indirectly via another station, to the probing station to thereby indicate their availability as neighbor stations able to receive or relay data, wherein the probing signals are transmitted at a first power level until a predetermined number of other stations have replied at which point the probing signals are transmitted at a second power level greater than the first power level;
      transmitting position data and/or position determining data in at least some of the probe signals and/or in responses to the probe signals, the position data including data indicative of an absolute or relative position of a station transmitting a probe signal or a response signal, and the position determining data including data usable by a station receiving a probe signal or a response signal to determine the absolute or relative position of the station and/or other stations;

maintaining, at stations which receive probe signals from one or more probing stations and/or response signals from one or more responding stations, position data and/or position determining data received from selected ones of the probing and/or responding stations;

at one or more of said stations maintaining said position data and/or position determining data, utilizing the position data and/or position determining data to determine the absolute or relative position of said each station and/or other stations, thereby enabling any station to determine its own position or the position of another station in the network either as an absolute position or relative to other stations;

after determining the locations of stations within the network, selecting a receiving station to which to send a communication;

determining an optimized route along which to send the communication to the receiving station, the optimized route based on a determined location of the receiving station, determined relative locations of one or more intermediate stations within the network, and the minimum power requirement for sending the communication to the receiving stations through the one or more intermediate stations; and sending the communication on the optimized route.

2. A method according to claim 1 wherein the position data and/or position determining data in the probe signals includes data indicating the absolute position or relative position of nearby stations selected by the station transmitting the probe signals.

3. A method according to claim 1 wherein the position data and/or position determining data is used to determine the relative or absolute position of other stations in direct communication with said each station, and also other stations not in direct communication with said each station.

4. A method according to claim 1 which is operated in a communication network in which the stations can transmit a message from an originating station to a destination station via at least one opportunistically selected intermediate station.

5. A method according to claim 1 which is operated in a network provided primarily for purposes of tracking or locating stations in the network.

6. A method according to claim 1 including selecting, at each station, a channel for transmission of probe signals to other stations, other stations which receive the probe signals from a probing station responding directly, or indirectly via other stations, on the selected channel.

7. A method according to claim 1 wherein stations include data in their probe signals relating to a length of time they have remained static, other stations receiving the probe signals utilizing position data and/or position determining data preferentially from stations that have remained static for the longest periods.

8. A method according to claim 1 wherein stations include auxiliary data in their probe signals relating to one or more of the following: a number and/or quality of transmission hops between stations identified in the probe signals; age data indicating an age of timing data or position data and/or position determining data included in the probe signals; the stated or determined level of accuracy of position information relating to one or more stations identified in the probe signals; and quality data indicating whether the probe signals have been sent at peaks of opportunity, other stations receiving the probe signals utilizing position data and/or position determining data therein selectively depending on the nature of the auxiliary data included in the received probe signals.

9. A method according to claim 1 wherein stations maintain historical position data of other stations for a predetermined time after such other stations have lost connectivity with one another, the historical position data being retrievable to determine the last known position of a station with which connectivity has been lost.

10. A method according to claim 1 wherein stations utilise variations in data in probe signals or other characteristics of the probe signals, arising out of relative movement between stations, to resolve ambiguities in relative position data and/or position determining data in the probe signals.

11. A method according to claim 1 wherein the nature or quality of a service available from a station in the network is adjusted according to the determined absolute or relative position of said station and/or other nearby stations.

12. A method according to claim 11 including providing information to a user of a station relating to facilities, objects or persons, or other stations near to the determined position of said station.

13. A method according to claim 1 wherein position information relating to a station is determined by transmitting gradient gathering probe signals between stations, directly or via one or more intermediate stations.

14. A method according to claim 13 wherein the gradient gathering probe signals are transmitted at an increased rate selected to provide enhanced resolution of the position information.

15. A method according to claim 14 wherein the gradient gathering probe signals are transmitted at an increased rate only while the position information is required.

16. A method according to claim 1 wherein a first station requiring position information relating to another station in the network transmits a position request message addressed to a central authority maintaining position data and/or position determining data of stations in the network; to one or more neighbors of the first, requesting station for onward transmission to the other station; or directly to the other station.

17. A method according to claim 16 wherein the station whose position is required transmits a reply message to the first station via the network with the required position information.

18. A method according to claim 16 wherein the first station transmits a gradient gathering probe signal addressed to the other station via one or more intermediate stations, said other station transmitting a response via one or more Intermediate stations to thereby create a gradient through the intermediate stations, the gradient providing information enabling a relative or absolute direction vector to be established between the first station and said other station.

19. A method according to claim 1 wherein the position data comprises position information indicating the position of one or more stations to a predetermined degree of accuracy.

20. A method according to claim 19 wherein the position data comprises absolute position information obtained from a station equipped with a station based positioning system, or a station with a known fixed location.

21. A method according to claim 20 comprising utilizing a combination of absolute and relative position information to determine the absolute position of further stations by determining their position relative to other stations that have previously determined their own absolute positions, so that such further stations that are unable to communicate directly with other stations that have absolute position information can nevertheless determine their own absolute position indirectly.

22. A method according to claim 20 including providing a number of seed stations, each of which is able to determine, or is provided with absolute position data defining, its own absolute position with relatively high accuracy, other stations transmitting probe signals to and receiving probe signals from the seed stations thus obtaining absolute position information from the seed stations to determine their own absolute positions, and further stations transmitting probe signals to and receiving probe signals from said other stations thus obtaining absolute position information from said other stations to determine their own absolute positions.

23. A method according to claim 1 wherein the position data comprises relative position information indicating the position of one or more stations relative to other stations.

24. A method according to claim 23 wherein the relative position information is obtained by stations determining an approximate distance between themselves utilizing transmission power and/or path loss data in probe signals transmitted between such stations.

25. A method according to claim 23 including obtaining position information indicating the position of one or more stations by triangulation.

26. A method according to claim 23 wherein the relative position information is obtained by stations determining a distance between themselves utilizing timing data extracted from probe signals transmitted between the stations.

27. A method according to claim 26 wherein the timing data includes processing delay data inserted into reply probe signals by stations responding to received probe signals, the processing delay data indicating a time taken at a station responding to a received probe signal to process the received probe signal.

28. A method according to claim 1 including transmitting clock data in the probe signals, and utilizing the clock data to determine a time taken for the probe signals to propagate between stations and hence a distance between said stations.

29. A method according to claim 28 including synchronizing clocks at the stations of the network, with updated timing data for this purpose being transmitted from a central timing authority to the other stations.

30. A method according to claim 29 wherein an acceptance or rejection of said updated timing data at any station is determined in response to a cumulative error function calculated in respect of transmission of such data, relative to other prior or simultaneous transmissions of such data received at said station, thereby maintaining a high level of accuracy in respect of the synchronization of clocks at each station of the network.

31. A method according to claim 29 wherein each station selects received probe signals from which to extract position or timing data according to the extent to which such received probe signals are determined to contain position or timing data of a high quality in terms of distance measurement capability or clock synchronization.

32. A method according to claim 31 comprising analyzing received probe signals to determine whether or not they are transmitted during optimum peaks of opportunity.

33. A method according to claim 31 comprising measuring path loss and/or multi-path distortion in such received probe signals, and selecting probe signals having low path Joss and/or low multi-path distortion for extraction of position or timing data therefrom.

34. A method of operating a network comprising a plurality of stations, the method comprising:

transmitting, with a transmitting station, a probe signal to one or more neighbor stations, the probe signal including position data of the transmitting station and identification data from the transmitting station, the probing signal being transmitted at a first power level;

transmitting, with the one or more neighbor stations, a response signal including position data of the one or more neighbor stations and the identification data in response to the probe signal;

transmitting, with the transmitting station, probe signals at increasing power levels higher than the first power level until a predetermined number of neighbor stations transmit response signals to the transmitting station, wherein the probe signals are transmitted on probe channels defined by a central authority, thereby reducing interference and preventing jamming or interception of the signals;

monitoring, at the transmitting station, the response signals to establish an availability of the one or neighbor stations and a determined position of the one or more neighbor stations that are available;

updating the determined position of one or more available neighbor stations based on differences in position data of the one or more available neighbor stations;

determining an available neighbor station to which to send a communication;

determining an optimized route along which to send the communication to the available neighbor station, the optimized route based on the determined location of the available neighbor station and the minimum power requirement for sending the communication to the available neighbor station through one or more other intermediate available neighbor stations; and sending the communication on the optimized route.

35. A network comprising a plurality of stations each able to transmit and receive data so that the network can transmit data between stations via at least one selected intermediate station, wherein each station in the network comprises a transmitter, a receiver and data processing means and is operable to:

monitor the activity of other stations on the network to establish an availability of neighbor stations having connectivity with the monitoring station;

transmit probe signals to other stations and receive probe signals from other stations so that other stations which receive the probe signals from a probing station can respond directly, or indirectly via another station to the probing station to thereby indicate their availability as neighbor stations able to receive or relay data which probing signals begin at low power then increase in power until a predetermined number of other stations have replied;

transmit position data and/or position determining data in at least some of the probe signals and/or in responses to probe signals, the position data including data indicative of the absolute or relative position of a station transmitting a probe signal or a response signal and the position determining data including data usable by a station receiving a probe signal or a response signal to determine the absolute or relative position of the station and/or other stations;

maintain at stations which receive probe signals from one or more probing stations and/or response signals from one or more responding stations position data and/or position determining data received from selected ones of the probing stations and/or responding stations;

utilize the maintained position data and/or position determining data to determine the absolute or relative position of said station and/or other stations thereby enabling any station to determine its own position or the position of another station in the network either as an absolute position or relative to other stations;

after determining the locations of stations within the network, select a receiving station to which to send a communication;

determine an optimized route along which to send the communication to the receiving station, the optimized route based on a location of the receiving station, relative locations of one or more intermediate stations within the network, and the minimum power requirement for sending the communication to the receiving stations through the one or more intermediate stations; and send the communication on the optimized route.

36. A network according to claim 35 wherein each station is operable to determine the absolute or relative position of other stations in direct communication with said station, and also other stations not in direct communication with said station.

37. A network according to claim 35 wherein at least some stations comprise a station based positioning system or are programmed with position data corresponding to a known fixed location.

38. A network according to claim 35 including a number of seed stations each able to determine its own absolute position with relatively high accuracy, so that other stations transmitting probe signals to and receiving probe signals from the seed stations can obtain absolute position information from the seed stations to determine their own absolute positions, and further stations transmitting probe signals to and receiving probe signals from said other stations can obtain absolute position information from said other stations to determine their own absolute positions.

39. A network according to claim 35 including a central authority to define probe channels for transmission of the probe signals, to reduce interference and prevent jamming or interception of the signals.

40. A network according to claim 35 wherein each station is adapted to determine an approximate distance between itself and other stations utilizing transmission power and/or path loss data in probe signals transmitted between the stations.

41. A network according to claim 40 wherein each station is adapted to obtain position information indicating the position of one or more other stations by triangulation.

42. A network according to claim 35 wherein the data processing means of each station is operable to analyze received probe signals to determine whether or not they are transmitted during optimum peaks of opportunity.

43. A network according to claim 42 wherein the data processing means is operable to analyze received probe signals by measuring path loss and/or multi-path distortion in received probe signals, and to select probe signals having low path loss and/or low multi-path distortion for extraction of position or timing data therefrom.

44. A network according to claim 35 wherein each station includes a clock and is arranged to transmit clock data in the probe signals, and to utilize the clock data to determine a time taken for the probe signals to propagate between stations and hence a distance between said stations.

45. A network according to claim 44 including a central timing authority for transmitting updated timing data to the stations of the network, and wherein each station is arranged to synchronize its clock with clocks of other stations of the network utilizing the updated timing data.

46. A network according to claim 45 wherein each station is arranged to accept or reject said updated timing data according to a cumulative error function calculated in respect of transmission of such data, relative to other prior or simultaneous transmissions of such data received at said station, thereby maintaining a high level of accuracy in respect of the synchronization of clocks at each station of the network.

* * * * *